(12) United States Patent
Jushchyshyn et al.

(10) Patent No.: US 11,411,361 B2
(45) Date of Patent: Aug. 9, 2022

(54) TOOL FOR INSTALLING ELECTRICAL CONNECTORS WITH AN EXTENDIBLE REACH TOOL

(71) Applicant: Burndy, LLC, Manchester, NH (US)

(72) Inventors: Jeremy Jushchyshyn, Willow Grove, PA (US); Nicholas Polidori, Medford, NJ (US); Michael Anthony Bucciero, Pennsauken, NJ (US); Patrick J. Shay, Cinnaminson, NJ (US); Andison A. Fernandez, Pennsauken, NJ (US)

(73) Assignee: BURNDY, LLC, Manchester, NH (US)

( * ) Notice: Subject to any disclaimer, the term of this patent is extended or adjusted under 35 U.S.C. 154(b) by 8 days.

(21) Appl. No.: 17/162,738

(22) Filed: Jan. 29, 2021

(65) Prior Publication Data
US 2021/0234322 A1 Jul. 29, 2021

Related U.S. Application Data

(60) Provisional application No. 62/967,495, filed on Jan. 29, 2020, provisional application No. 63/059,661, filed on Jul. 31, 2020.

(51) Int. Cl.
*H01R 43/00* (2006.01)
*H02G 1/02* (2006.01)
*H01R 4/50* (2006.01)

(52) U.S. Cl.
CPC .............. *H01R 43/00* (2013.01); *H02G 1/02* (2013.01); *H01R 4/5083* (2013.01)

(58) Field of Classification Search
CPC .... H01R 43/00; H01R 4/5083; H01R 4/5091; H01R 11/14; H01R 43/027; H02G 1/02; Y10T 29/53209; Y10T 29/53217; Y10T 29/53226

USPC ............................................ 29/747, 749–751
See application file for complete search history.

(56) References Cited

U.S. PATENT DOCUMENTS

| 2,868,051 | A | | 1/1956 | Cupre et al. |
| 3,199,062 | A | | 3/1962 | Wantz, Jr. |
| 3,516,050 | A | | 10/1964 | Mixon, Jr. et al. |
| 3,212,534 | A | * | 10/1965 | Broske ..................... H01R 4/08 29/254 |
| 3,458,996 | A | * | 8/1969 | Lenhart, Jr. ............ H01R 11/14 29/254 |
| 5,533,254 | A | | 7/1996 | Gallo et al. |
| 5,547,305 | A | | 8/1996 | Treche |

(Continued)

FOREIGN PATENT DOCUMENTS

CN 109301537 2/2019

OTHER PUBLICATIONS

Ondrives, Precison Gearbox Specification Sheets; Apr. 2017, www.ondrives.com, pp. 1-8.

(Continued)

*Primary Examiner* — Donghai D Nguyen
(74) *Attorney, Agent, or Firm* — Wissing Miller LLP

(57) ABSTRACT

The present disclosure provides embodiments of a tool adapted to electrically and mechanically connect an electrical connector to electrical conductors using an extendable reach tool. The tool permits one or more lineman to remotely connect an electrical connector to electrical conductors. The tool includes a glide track assembly, a connector holding member, a gear assembly and a fastener head driver.

20 Claims, 31 Drawing Sheets

(56) References Cited

U.S. PATENT DOCUMENTS

| | | | |
|---|---|---|---|
| 7,374,508 | B2 | 5/2008 | Duncan |
| D615,840 | S | 5/2010 | Copper et al. |
| 7,972,155 | B1 | 7/2011 | Siebens |
| 9,102,043 | B2 | 8/2015 | Morin et al. |
| 9,160,128 | B2 | 10/2015 | Chadbourne et al. |
| 9,656,381 | B2 | 5/2017 | Niles et al. |
| 10,020,629 | B1 | 7/2018 | Wise |
| 10,700,449 | B2 * | 6/2020 | Serre .................... H01R 4/5091 |
| 2004/0177495 | A1 | 9/2004 | Itrich |
| 2009/0223042 | A1 | 9/2009 | Chadbourne et al. |
| 2012/0284997 | A1 | 11/2012 | Morin et al. |

OTHER PUBLICATIONS

Ondrives, Bevel Gearbox Specification Sheets; Apr. 2017, www.ondrives.com, pp. 1-6.

Honeywell Safety Products, Salisbury Utility Products Catalog, Jul. 2015, salisburybyhoneywell.com, Section L, pp. L1-L30.

International Search Report and Written Opinion mailed in corresponding International Application PCT/US2021/015817 dated Apr. 14, 2021.

* cited by examiner

TOOL FOR INSTALLING ELECTRICAL CONNECTORS WITH AN EXTENDIBLE REACH TOOL

CROSS REFERENCE TO RELATED APPLICATIONS

The present disclosure is based on and claims benefit from U.S. Provisional Patent Application Ser. No. 62/967,495 filed on Jan. 29, 2020 entitled "Tool for Installing Electrical Connectors with an Extendible Reach Tool" and from U.S. Provisional Application Ser. No. 63/059,661 filed on Jul. 31, 2020 entitled "Tool for Installing Electrical Connectors with an Extendible Reach Tool" the contents of each are incorporated herein in their entirety by reference.

BACKGROUND

Field

The present disclosure relates generally to tools for installing electrical connectors. More particularly, the present disclosure relates to tools for installing electrical connectors onto live power conductors using an extendable reach tool.

Description of the Related Art

Utility linemen build, repair and maintain overhead and/or underground power distribution systems. When building, repairing and/or maintaining overhead power distribution system conductors, linemen use connectors to tap main conductors to feed electrical power to distribution conductors, which are also referred to as tap conductors. The main conductors and the tap conductors are typically high voltage conductors having the same or different diameters. Specially designed connectors, such as wedge-type tap connectors, are used to connect the tap conductors to the main conductors. In some instances, when connecting a tap conductor to a main conductor, the lineman makes such connections while the main conductor is "ON" or "live."

Given the high voltage and power involved in connecting a tap conductor to a live main conductor, linemen must remain a safe distance away when tapping power from the main conductors. Typically, the lineman wears special gloves and other safety equipment and uses specialized tools when attempting to tap live power conductors. For example, multiple extendable reach tools made of dielectric material, e.g., hotsticks, with a wide variety of attachment tools can be used to make such connections. Typically, when using a wedge type connector to connect a tap conductor to a main conductor, the C-shaped frame of the wedge type connector is held remotely by one hotstick, the wedge of the wedge type connector is held remotely by another hotstick and the interface is held remotely by another hotstick. As a result, two or more linemen are required to connect a tap conductor to a main conductor, due to the number of hotsticks needed, increasing the cost to install such a connector. In addition, connecting a tap conductor to a main conductor may require the use of a number of different types of specialized tools to be attached to the hotsticks, which also increases the cost to install such a connector.

SUMMARY

The present disclosure provides embodiments of a tool or jig adapted to electrically and mechanically connect an electrical connector to electrical conductors using extendable reach tools. The tool permits one or more lineman to remotely connect an electrical connector to electrical conductors.

In an exemplary embodiment, the tool or jig includes a gear assembly, a head driver, a connector holding member and a loading system. The gear assembly has first and second drive members extending therefrom. The gear assembly is adapted to translate movement, e.g., rotational movement, of the first drive member to movement, e.g., rotational movement, of the second drive member. The head driver has a first end connected to the first or second drive member such that movement, e.g., rotational movement, of the first or second drive member causes movement, e.g., rotational movement, of the head driver. The connector holding member is configured to support and at least temporarily hold the electrical connector. The loading system is connected between the gear assembly and the connector holding member. The loading system is movable between a loading position where the connector holding member can support and at least temporarily hold the electrical connector and a loaded position where the head driver can operatively engaged with a fastener of the electrical connector. The loading system is also configured to normally bias the connector holding member toward the loaded position. The tool may also include a first adapter a coupled to the first drive member or the second drive member, and a second adapter coupled to the connector holding member. In this exemplary embodiment, the gear assembly further includes a gear housing and a gear system within the gear housing, and the first drive member is at least partially within the gear housing and the second drive member at least partially within the gear housing. As a non-limiting example, the gear system may include a first bevel gear meshed with a second bevel gear.

In another exemplary embodiment, the tool or jig includes a gear assembly, a connector holding member, a connector loading system and a fastener head driver. The gear assembly has a gear housing, a gear system within the housing, a first drive member at least partially within the housing and a second drive member at least partially within the housing. The first and second drive members are meshed with or coupled to the gear system to translate rotational movement of the first drive member to rotational movement of the second drive member. The connector holding member is configured and dimensioned to support and at least temporarily hold the electrical connector. An example of the connector holding member is a carriage. The connector loading system is connected to the gear assembly housing and the connector holding member. The connector loading system is configured and dimensioned to permit the connector holding member to move between a loading position and a loaded position, and to normally bias the connector holding member toward the loaded position. The fastener head driver is connected to the first or second drive member such that rotation of the first or second drive member causes rotation of the fastener head driver.

In another exemplary embodiment, the tool or jig includes an interface housing, a gear assembly, a connector holding member, a rail, a connector loading system and a fastener head driver. The gear assembly is positioned at least partially within the interface housing. The gear assembly has a gear system, a first drive member at least partially within the interface housing and a second drive member at least partially within the interface housing. The first and second drive members are meshed with or coupled to the gear system to translate rotational movement of the first drive member to rotational movement of the second drive member. The connector holding member is configured to support and at least temporarily hold an electrical connector. An example of the connector holding member is a carriage. The rail has a first end connected to the interface housing and a second end connected to the connector holding member. The rail guides movement of the connector holding member between a loading position and a loaded position. The connector loading system is connected to the interface housing and the connector holding member. The connector loading system is configured to permit the connector holding member to move along the rail between the loading position and the loaded position, and to normally bias the connector holding member toward the loaded position. The fastener head driver is connected to the first or second drive member so that rotation of the first or second drive member causes rotation of the fastener head driver. An example of the fastener head driver is a socket.

In another exemplary embodiment, the tool or jig includes an interface housing, a gear assembly, a connector holding member, a rail, a connector loading system and a fastener head driver. The gear assembly is positioned at least partially within the interface housing. The gear assembly has a gear system, a first drive member at least partially within the interface housing and a second drive member at least partially within the interface housing. The first and second drive members are coupled to the gear system to translate rotational movement of the first drive member to rotational movement of the second drive member. The first extendable reach tool adapter is coupled to the first drive member outside the interface housing, and the second extendable reach tool adapter is coupled to the second drive member outside the interface housing. The connector holding member is configured to support and at least temporarily hold the electrical connector. An example of the connector holding member is a carriage. The rail has a first end connected to the interface housing and a second end connected to the connector holding member so that the rail guides movement of the connector holding member between a loading position and a loaded position. The connector loading system is connected to the interface housing and the connector holding member. The connector loading system is configured to permit the connector holding member to move along the rail between the loading position and the loaded position, and to normally bias the connector holding member toward the loaded position. The head driver is connected to the first or second drive member such that rotation of the first or second drive member causes rotation of the fastener head driver. An example of the fastener head driver is a socket.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

The present disclosure provides exemplary embodiments of a tool adapted to electrically and mechanically connect an electrical connector to electrical conductors using one or more extendable reach tools. The tool according to the present disclosure permits one or more lineman to remotely connect an electrical connector to electrical conductors. As an example, and referring to FIG. 1, the tool according to the present disclosure permits a single lineman to remotely connect a tap conductor to a main conductor with a wedge type electrical connector using two extendable reach tools. For ease of description, the electrical cable connectors referenced herein include, but are not limited to, wedge type cable connectors and may also be referred to herein as the "connectors" in the plural and the "connector" in the singular. The main conductors referenced herein include, but are not limited to, conductors that provide electrical power to distribution conductors, and may also be referred to herein as the "main conductors" in the plural and the "main conductor" in the singular. The tap conductors referenced herein include, but are not limited to, branch conductors, and may also be referred to herein as "tap conductors." For general reference purposes, a main conductor supplies power from either a transmission circuit or a distribution circuit, and a tap conductor distributes power to a distribution circuit or a load.

Figure 1:
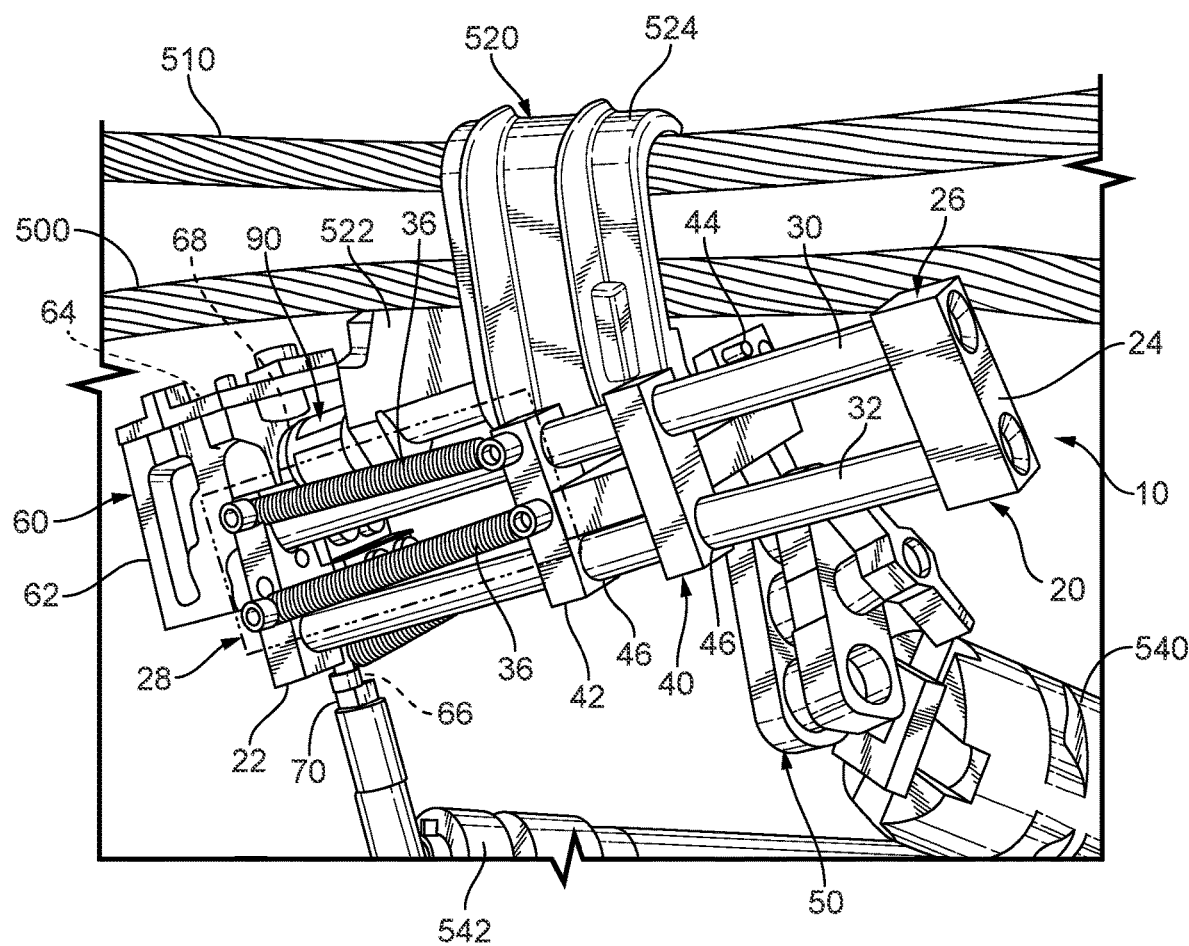
FIG. 1 is a perspective view of an exemplary embodiment of a wedge type electrical cable connector assembly being installed using an exemplary embodiment of the tool according to the present disclosure.
Figure 2:
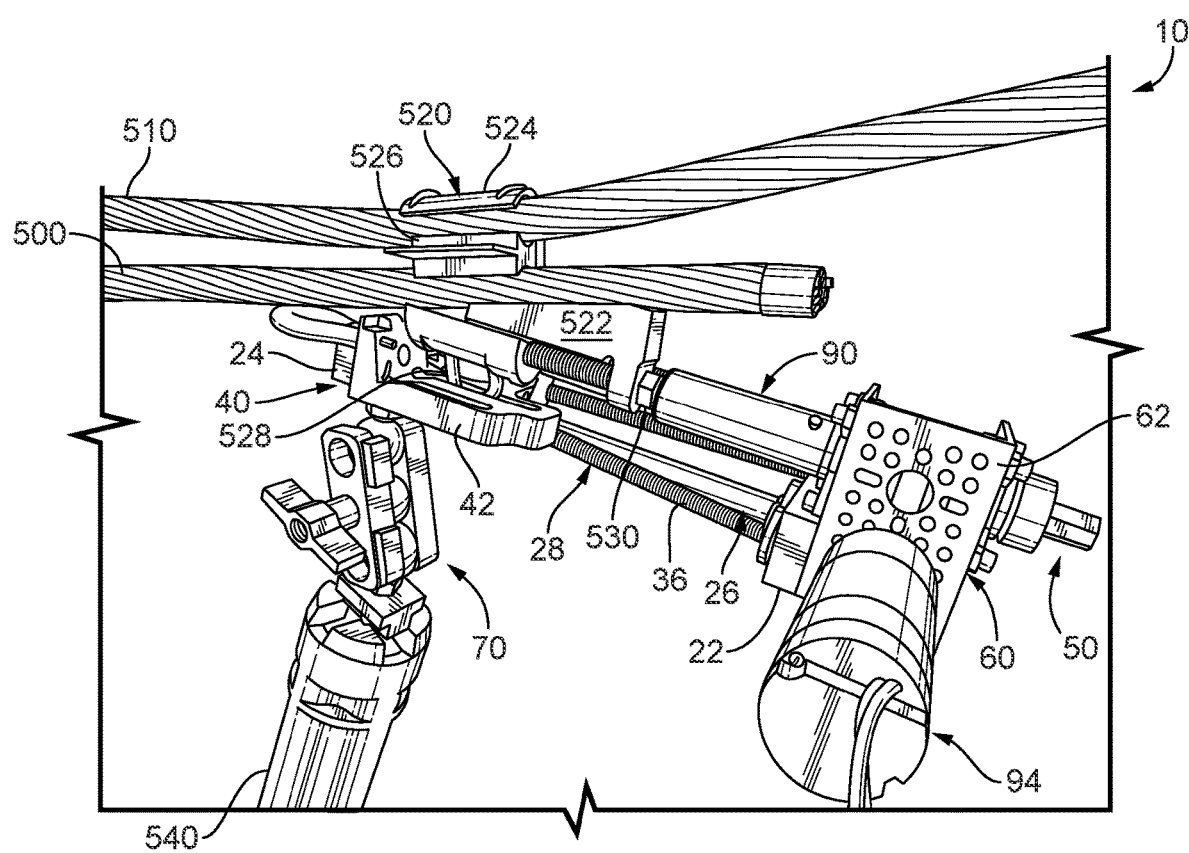
FIG. 2 is a perspective view of another exemplary embodiment of a wedge type electrical cable connector assembly being installed using another exemplary embodiment of the tool according to the present disclosure.

The tool 10 according to the present disclosure will be described herein in association with electrically connecting a tap conductor 500 to a main conductor 510 using a wedge type electrical cable connector 520. The wedge type cable connector 520 includes a wedge assembly 522, a frame 524 and an interface 526 that is placed between the tap conductor 500 and the main conductor 510, as seen in FIGS. 1 and 2. However, other types of wedge type connectors may be used with the tool 10 of the present disclosure.

Referring again to FIG. 1, an exemplary embodiment of a tool 10 is shown. In this exemplary embodiment, the tool 10 includes a glide track assembly 20, a connector holding member 40, a gear assembly 60 and a fastener head driver 90. For ease of description, the connector holding member 40 may also be referred to herein as a "carriage," the gear assembly 60 may also be referred to herein as a "gearbox" and the fastener head driver 90 may also be referred to herein as the "head driver." The glide track assembly 20 is configured and dimensioned to operatively interact with the carriage 40 so that the carriage 40 can glide along the glide track assembly 20 between a loading position and a loaded position. In the loading position, a connector 520 mounted to the carriage 40 is aligned for coupling to the gearbox 60, and in the loaded position the connector 520 mounted to the carriage 40 is operatively coupled to the gearbox 60. In the exemplary embodiment shown, the glide track assembly 20 includes a first end bracket 22, a second end bracket 24, a rail system 26 and a biasing system 28. The rail system 26 in this exemplary embodiment includes a first guide rail 30 and a second guide rail 32. In this exemplary embodiment, the first and second guide rails 30 and 32 may be hollow cylindrical tubes or solid cylindrical shafts. The first and second guide rails 30 and 32 are attached to the first end bracket 22 and the second end bracket 24, as shown, and the biasing system 28 is operatively connected between the first end bracket 22 and the carriage 40. The biasing system 28 is provided to normally bias the carriage 40 toward the gearbox 60 with sufficient force to hold a connector 520 mounted on the carriage 40 into operative engagement with the head driver 90 as described below. In the exemplary embodiment shown, the biasing system 28 includes one or more tension springs 36 having one end secured to the first end bracket 22 and the other end secured to the carriage 40 such that when the carriage 40 is moved toward the loading position, the one or more tension springs 36 would stretch creating a spring force on the tension springs 36. When the spring force is removed from the carriage 40, the springs 36 return the carriage 40 to the loaded position with sufficient force to hold a connector 520 mounted on the carriage 40 into operative engagement with the head driver 90. This force to hold the connector may also be referred to herein as a "holding force." As a non-limiting example, the holding force may be in the range from about 5 lbs. to about 30 lbs.

Figure 6:
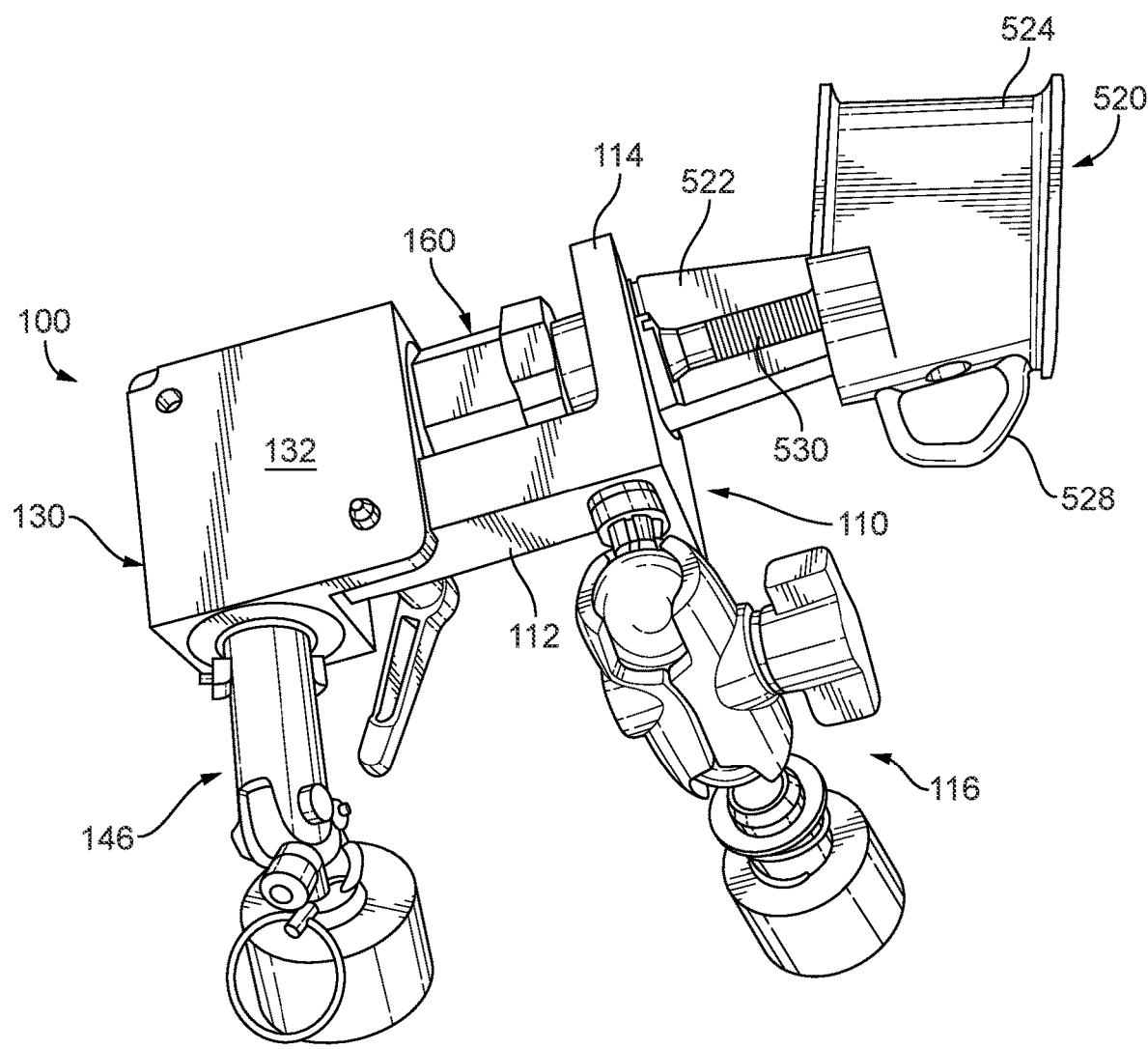
FIG. 6 is a second side perspective view of the tool of FIG. 5.

Continuing to refer to FIG. 1, the carriage 40 includes a base 42 and a connector brace 44. The base 42 includes a plurality of guide rail apertures 46 configured and dimensioned to receive the guide rails 30 and 32 so that the carriage 40 can glide along the guide rails 30 and 32 between the loading position and the loaded position. The guide rail apertures 46 may also include ball bearing bushings and rubber seals to facilitate easy movement of the carriage 40 along the guide rails 30 and 32. The base 42 also include one or more slots 48, similar to the slots seen in FIG. 3. The one or more slots are configured and dimensioned to receive an eye 528 of a connector 520, seen in FIG. 6. In this configuration, a connector 520 can be mounted to the carriage 40 by inserting the eye 528 into a slot 48 in the base 42 such that one end of the connector 520 abuts the connector brace 44. Extending from the base 42 is a first hotstick adapter 50 used to couple a first extendable reach tool 540, e.g., a hotstick, to the carriage 40. In the exemplary embodiment shown, the first hotstick adapter 50 is a Ram Mounts universal ball and socket arm mounting system, manufactured by National Products, Inc.

Continuing to refer to FIG. 1, the gear assembly 60 is secured to the first end bracket 22 of the glide track assembly 20. The gear assembly 60 has a gear housing 62, a gear system 64, seen in FIG. 4, within the gear housing 62, a first drive member 66 and a second drive member 68. The first drive member 66 extends from the gear housing 62 in a first direction that is the same as the direction the first hotstick adapter 50 extends from the carriage 40. In this exemplary embodiment, the first drive member 66 includes a first axel extending through an aperture in the gear housing 62. The aperture in the gear housing 62 may include a ball bearing bushing and rubber seals that permits the first axel 66 to pass through the gear housing 62, permits the first axel 66 to freely rotate and seals the aperture from certain environmental conditions. An end of the first axel outside the gear housing 62 is connected to a second hotstick adapter 70. The second hotstick adapter 70 permits a second extendable reach tool 542, e.g., a hotstick, to be coupled to the gear assembly 60 so that the first axel can be rotated or otherwise driven by the second extendable reach tool 542. The second drive member 68 extends from the gear housing 62 in a second direction that is parallel to the direction of movement of the carriage 40 along the guide track assembly 20. In the exemplary embodiment shown, the second direction is substantially perpendicular to the first direction associated with the first gear drive member 66. The second drive member 68 includes a second axel extending through an aperture in the gear housing 62. The aperture may include a ball bearing bushing and rubber seals that permits the second axel 68 to pass through the gear housing 62, permits the second axel 68 to freely rotate and seals the aperture from certain environmental conditions. An end of the second axel outside the gear housing 62 is connected to the head driver 90. The gear system 64 is within the gear housing 62 and is provided to translate rotational movement of the first axel to rotational movement of the second axel. As such, the end of the first axel inside the gear housing 62 and the end of the second axel in the gear housing are operatively coupled or meshed to the gear system 64. In an exemplary embodiment, the gear system 64 may include one or more worm gears meshed with one or more spur gears. In another exemplary embodiment, the gear system 64 may include a plurality of bevel gears that form a right angle gear system. A non-limiting example of such a right angle bevel gear system is the BGH31-1 right angle bevel gearbox manufactured by Ondrives Ltd. of Derbyshire, England. The gear ratio of the gear assembly 60 is dependent upon a number of factors, including for example, the size of the main conductor and the tap conductor to be connected, the type fastener 530 on the connector 520, and the dimensions of the wedge assembly 522 of connector 520. For example, the gear ratio of the gear assembly 60 may range from about 1:1 to about 1:20.

Continuing to refer to FIG. 1, the head driver 90 is provided to drive a fastener 530 of the connector 520, seen in FIG. 2. The head driver 90 may be integrally or monolithically formed into the second drive member 68 or the head driver 90 may be secured to the second drive member 68 using, for example, mechanical fasteners. The head driver 90 is configured and dimensioned to couple to a head of the fastener 530 of the connector 520 in order to drive the wedge of the connector 520 as is known. For example, the head driver 90 may be a cylindrical body with a hexagonal opening in one end adapted to fit onto a hexagonal head of a fastener 530, similar to a socket of a socket set.

To install a connector 520 onto a main conductor 510, the connector 520 is first mounted to the tool 10. The eye 528 of the connector 520 is positioned within a slot 48 in the base 42 of the carriage 40 so that the connector abuts the connector brace 44. The first extendable reach tool 540 is then coupled to the first hotstick adapter 50 and a second extendable reach tool 542 is coupled to the second hotstick adapter 70. The first hotstick 540 is then moved in the direction of the loading position pulling the carriage 40 in the same direction. As the carriage moves toward the loading position, the biasing system 28, here the springs 36, stretch loading the carriage with an opposing force that is approximately proportional to the change in length of the spring when the spring is stretched. The head of the fastener 530 of the connector 520 is aligned with the head driver 90 as the force applied to the carriage 40 is reduced causing the carriage to move toward the loaded position. By reducing the force applied to the carriage 40 the biasing system biases the carriage 40 to move in the opposite direction towards the loaded position. When the head of the fastener 530 is within the head driver 90, the carriage 40 is in the loaded position and ready for installing the connector 520 onto the main conductor 510 and the tap conductor 500. To install the connector 520 onto the main conductor 510 and the tap conductor 500, the lineman raises both extendable reach tools 540 and 542 so that the main conductor 510 and the tap conductor 500 are within the frame 524 of the connector 520, as shown in FIG. 1. The interface 526 of the connector is then placed between the main conductor 510 and the tap conductor 500 using for example the second extendible reach tool 542.

The second extendable reach tool 542 then rotates the second hotstick adapter 70 causing the gear system 64 to activate so that the head driver 90 begins to rotate in a clockwise direction. Rotation of the head driver 90 causes the head of the fastener 530 to rotate thus tightening the wedge assembly 522 of the connector 520. As the wedge assembly 522 tightens, the tap conductor 500 and interface 526 move toward the main conductor 510 within the frame 524 tightening the tap conductor 500 and interface 526 to the main conductor 510. In instances when the fastener 530 is a shear head type fastener, the wedge assembly 522 is tightened until the shear head of the fastener 530 shears, which indicates that conductors 500 and 510 are connected together with sufficient force. Once the connector 520 is secured to the conductors, the first extendable reach tool 540 is again moved toward the loading position releasing the head of the fastener 530 from the head driver 90 so that the tool 10 can be lowered to separate the tool 10 from the connector 520.

Figure 3:
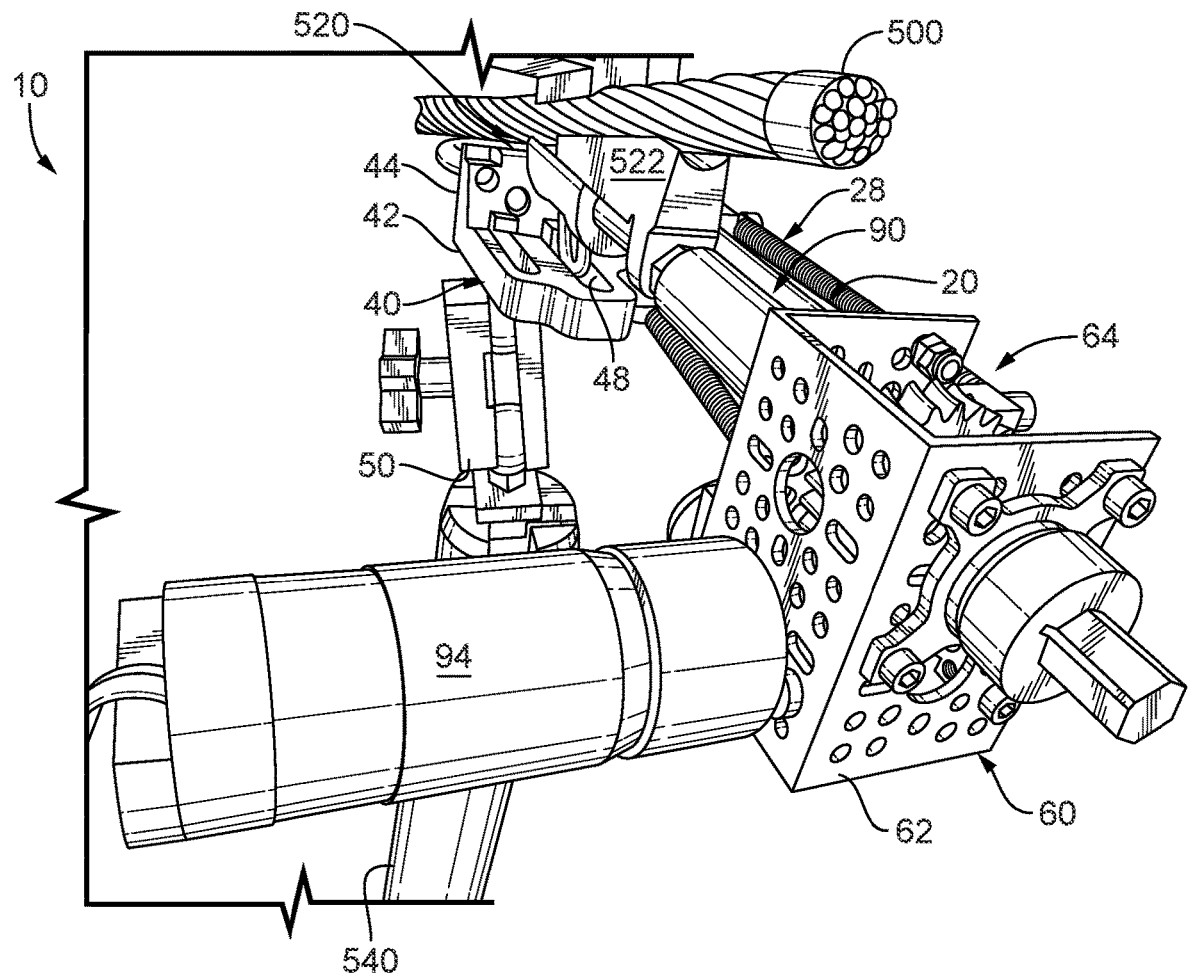
FIG. 3 is a perspective view of the wedge type electrical cable connector assembly being installed using the tool of FIG. 2.
Figure 4:
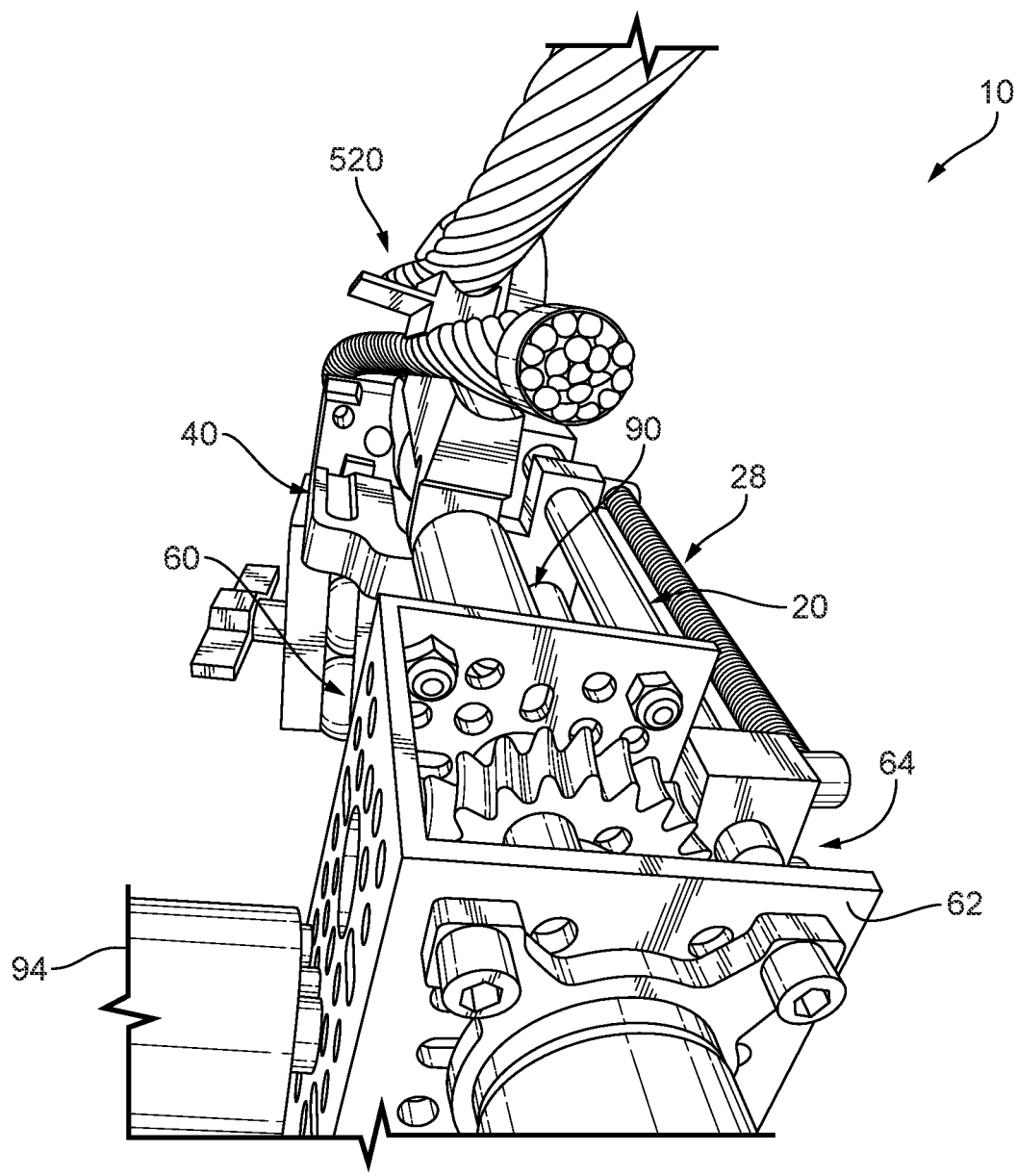
FIG. 4 is another perspective view of the wedge type electrical cable connector assembly being installed using the tool of FIG. 2.

Referring now to FIGS. 2-4, another exemplary embodiment of the tool 10 is shown. This exemplary embodiment of the tool 10 is substantially the same as the embodiment of FIG. 1 except that a motor 94 is connected to the first drive member 66 extending from the gearbox 60, and the gear housing 62 has the second hotstick adapter 70 extending therefrom and used to manipulate the tool 10 with the second extendable reach tool, e.g., the hotstick 542 seen in FIG. 1. In this embodiment, when the head of the fastener 530 is within the head driver 90, the carriage 40 is in the loaded position and ready for installing the connector 520 onto the main conductor 510 and the tap conductor 500.

To install the connector 520 onto the main conductor 510 and the tap conductor 500, the lineman raises both extendable reach tools 540 and 542 so that the main conductor 510 and the tap conductor 500 are within the frame 524 of the connector 520, as shown in FIG. 2. The interface 526 of the connector is then placed between the main conductor 510 and the tap conductor 500 using for example the second extendible reach tool 542. The motor 94 is then energized to rotate the first drive member 66 causing the gear system 64 to activate so that the head driver 90 begins to rotate in a clockwise direction. Rotation of the head driver 90 causes the head of the fastener 530 to rotate thus tightening the wedge assembly 522 of the connector 520. As the wedge assembly 522 tightens, the tap conductor 500 and interface 526 move toward the main conductor 510 within the frame 524 tightening the tap conductor 500 and interface 526 to the main conductor 510. In instances when the fastener 530 is a shear head type fastener, the wedge assembly 522 is tightened until the shear head of the fastener 530 shears, which indicates that conductors 500 and 510 are connected together with sufficient force. Once the connector 520 is secured to the conductors, the first extendable reach tool 540 is again moved toward the loading position releasing the head of the fastener 530 from the head driver 90 so that the tool 10 can be lowered to separate the tool 10 from the connector 520.

Figure 7:
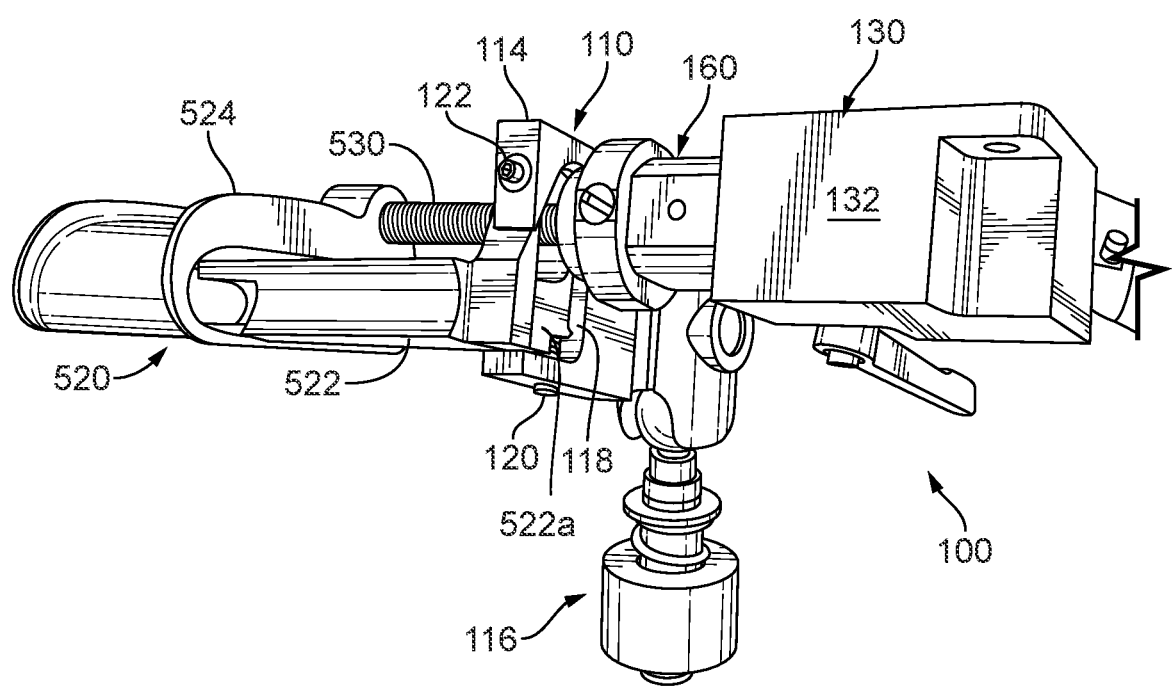
FIG. 7 is a top perspective view of the tool of FIG. 5.
Figure 8:
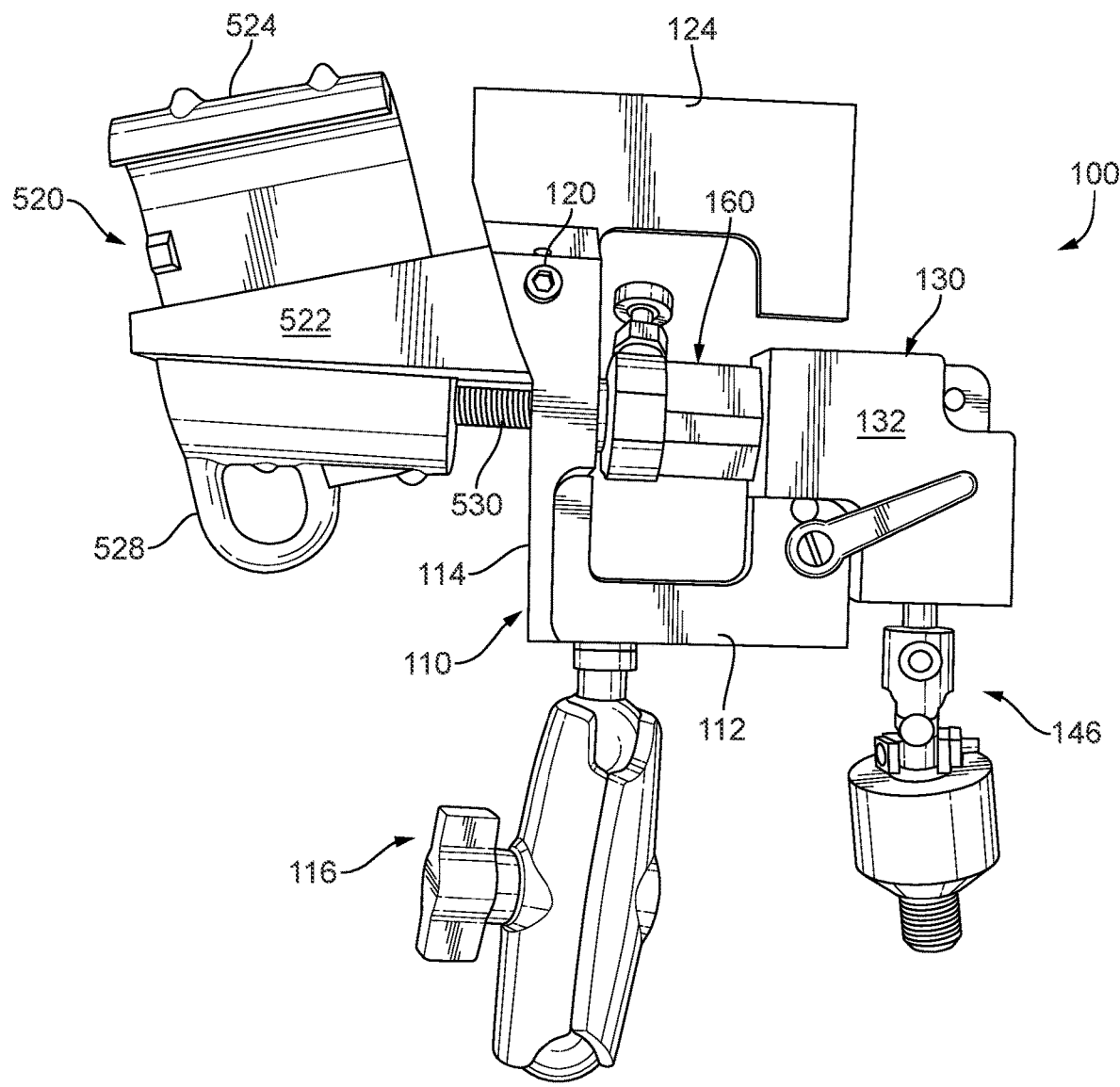
FIG. 8 is a first side perspective view of another exemplary embodiment of the tool according to the present disclosure which is similar to the embodiment of FIG. 5.
Figure 9:
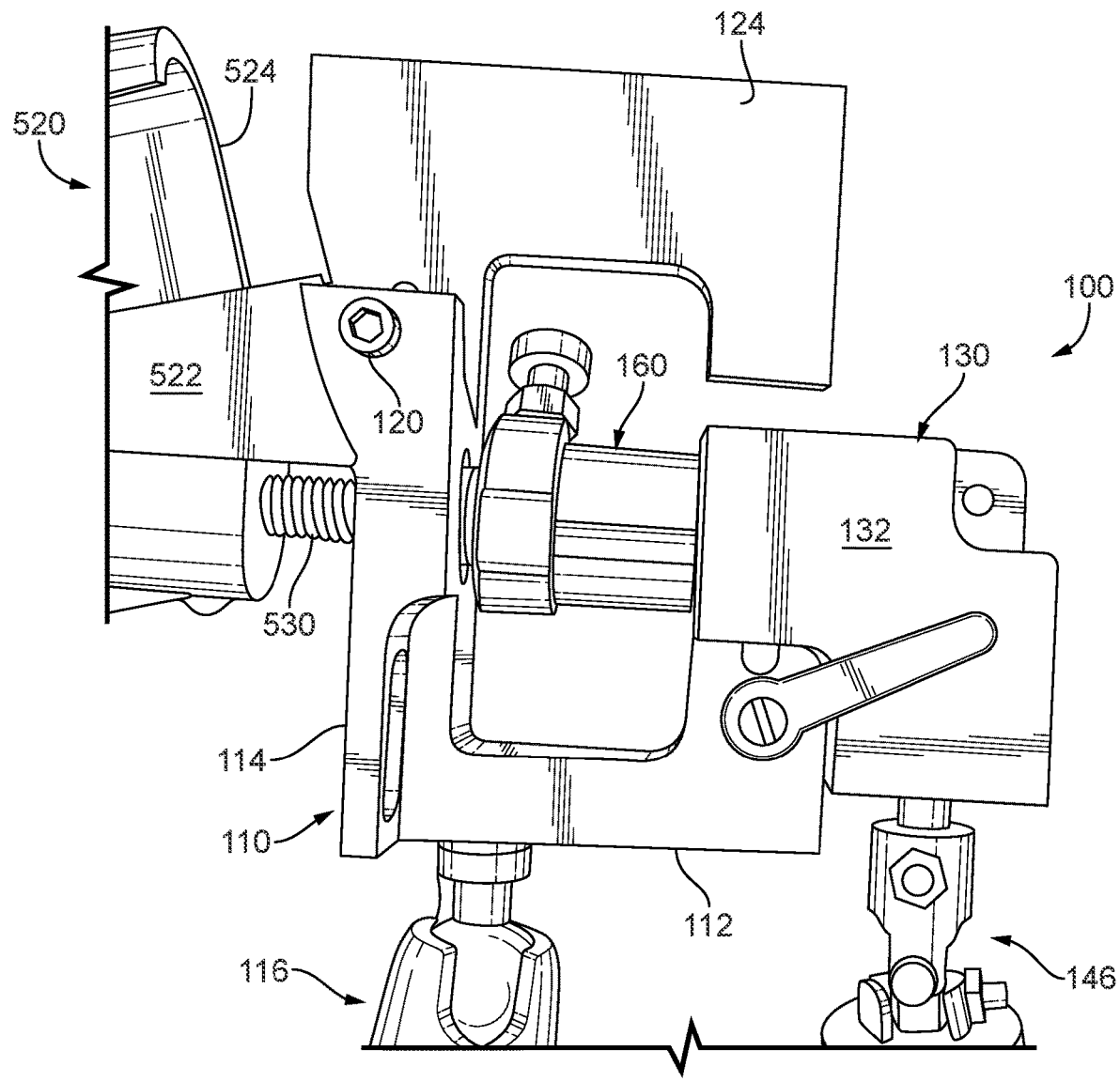
FIG. 9 is an enlarged side perspective view of the tool of FIG. 8.
Figure 10:
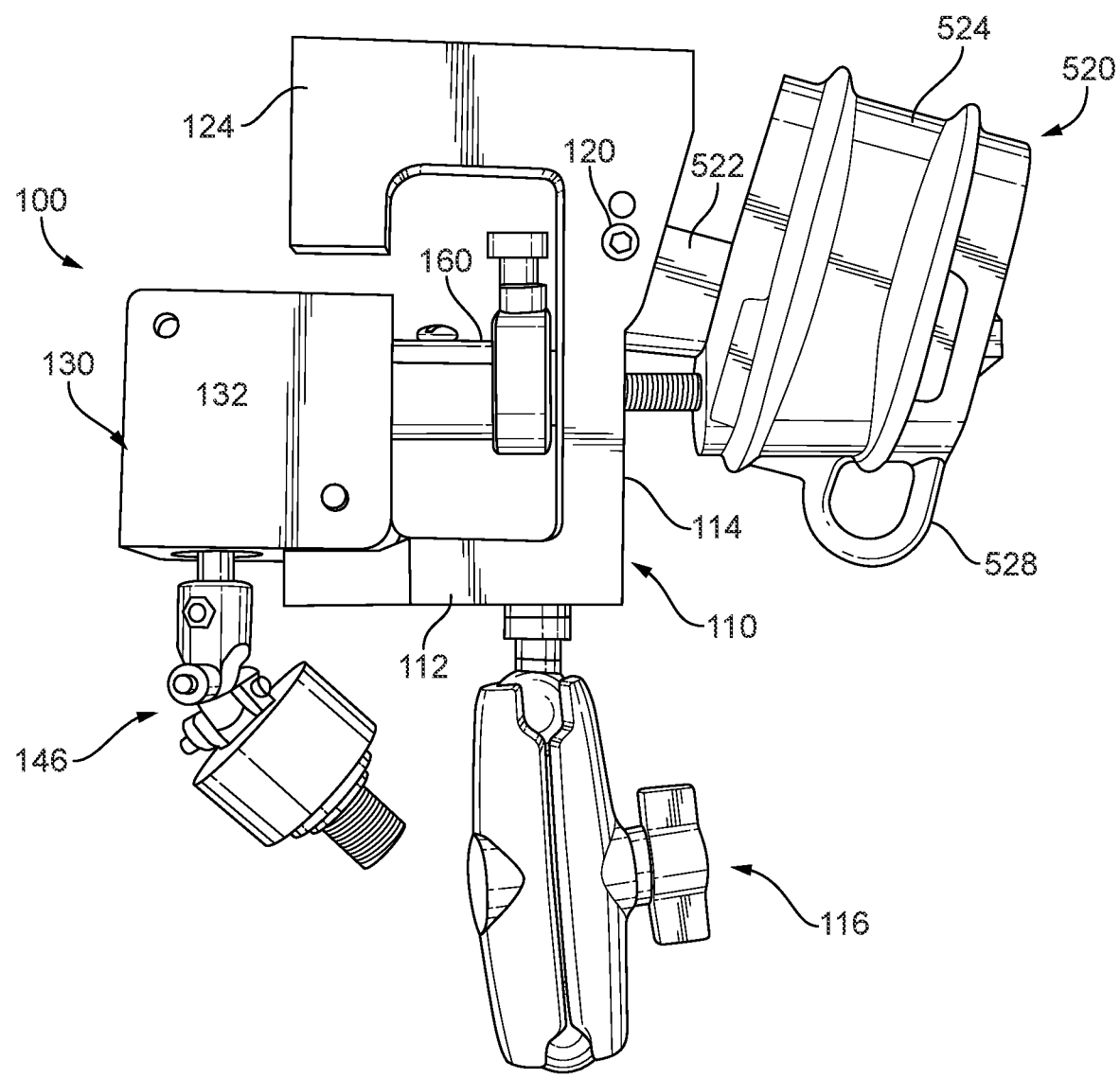
FIG. 10 is a second side perspective view of the tool of FIG. 8.
Figure 11:
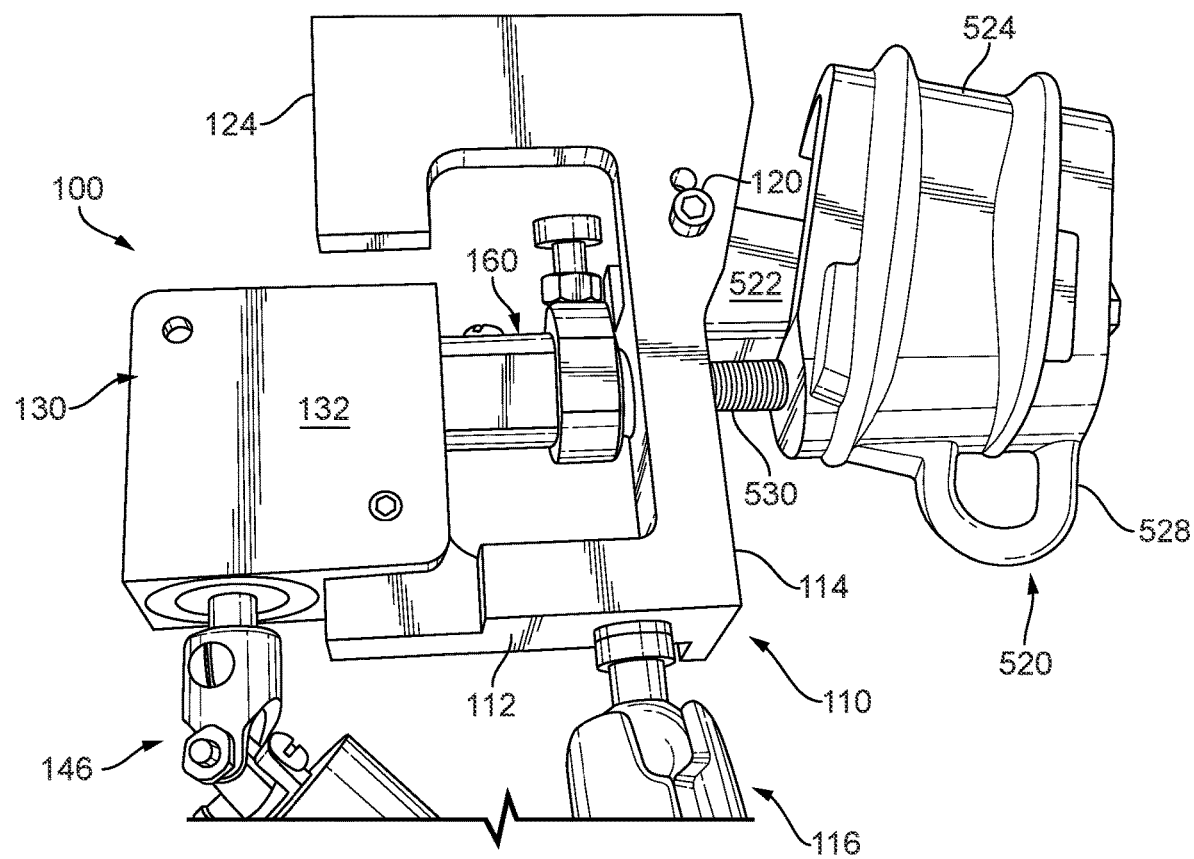
FIG. 11 is an enlarged side perspective view of the tool of FIG. 10.

Referring now to FIGS. 5-11, another exemplary embodiment of the tool according to the present disclosure is shown. In this exemplary embodiment, the tool 100 includes a connector holding member 110, a gear assembly 130 and a fastener head driver 160. For ease of description in this exemplary embodiment, the connector holding member 110 may also be referred to herein as a "holding member," the gear assembly 130 may also be referred to herein as a "gearbox" and the fastener head driver 160 may also be referred to herein as the "head driver." The holding member 110 is provided to releasably hold a connector 520 to the tool 100. In this exemplary embodiment, the holding member 110 includes base 112 and a connector brace 114. Extending from the base 112 is a first hotstick adapter 116 used to couple a first extendable reach tool, e.g., the hotstick 540, to the base 112. In the exemplary embodiment shown, the first hotstick adapter 116 is a Ram Mounts universal ball and socket arm mounting system, manufactured by National Products, Inc. The connector brace 114 extends from the base 112 and includes an opening 118, seen in FIG. 7, configured and dimensioned to receive the head of a fastener 530 of a connector 520 and a portion 522a of the wedge assembly 522 of the connector, as shown in FIG. 7. The connector brace 114 may be integrally or monolithically formed into the base 112 or the connector brace 114 may be secured to the base 112 using, for example, welds or mechanical fasteners. In this configuration, releasable fasteners 120 and 122, seen in FIG. 7, may be used to releasably attach the portion 522a of the wedge assembly 522 into the opening 118 of the connector brace 114. In this exemplary embodiment, the holding member 110 may also include a back plate 124, seen in FIGS. 8-11, extending from the connector brace 114. The back plate 124 may be integrally or monolithically formed into the connector brace 114 or the back plate 124 may be secured to the connector brace 114 using, for example, welds or mechanical fasteners.

Figure 5:
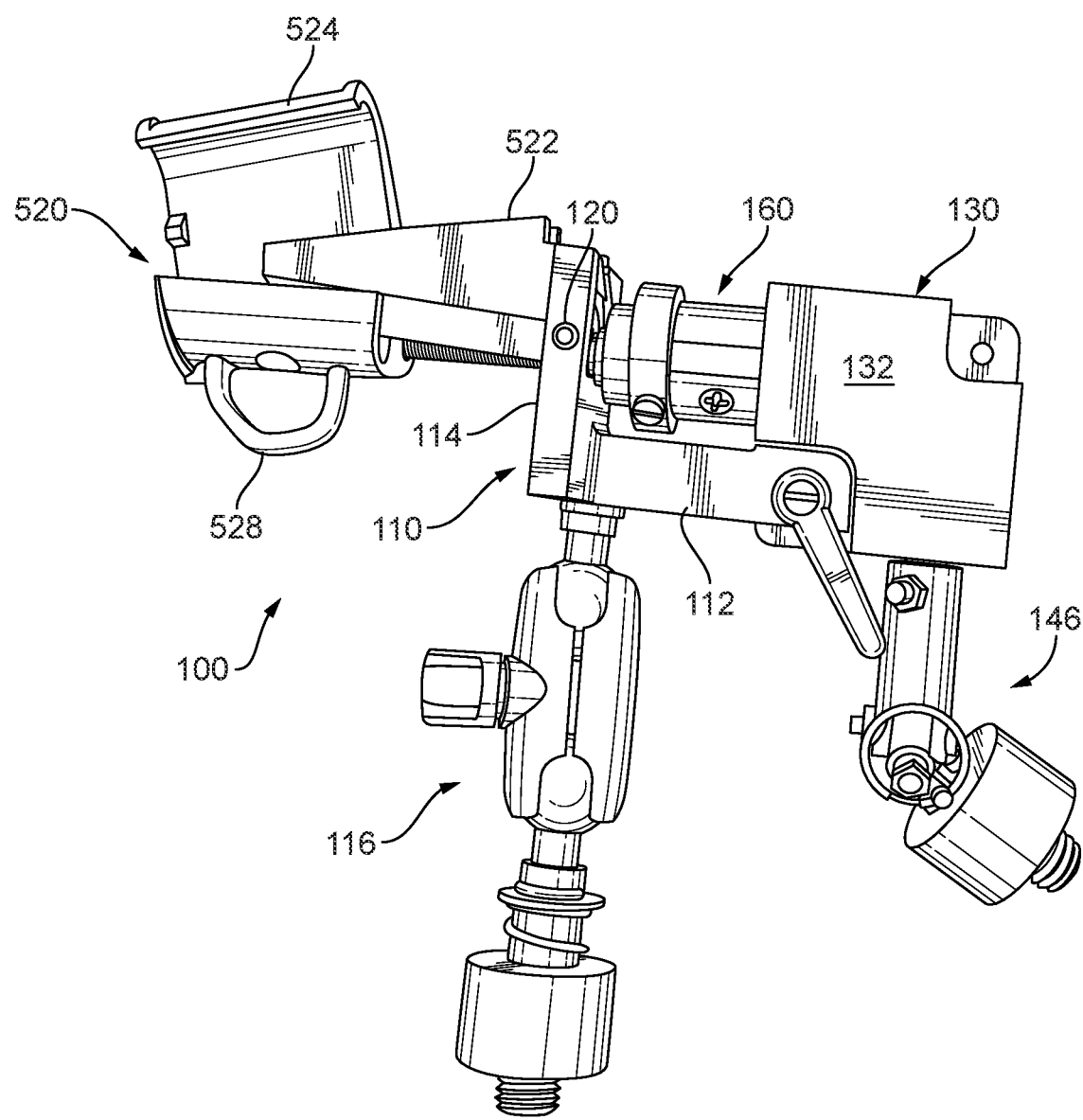
FIG. 5 is a first side perspective view of another exemplary embodiment of the tool according to the present disclosure.
Figure 5A:
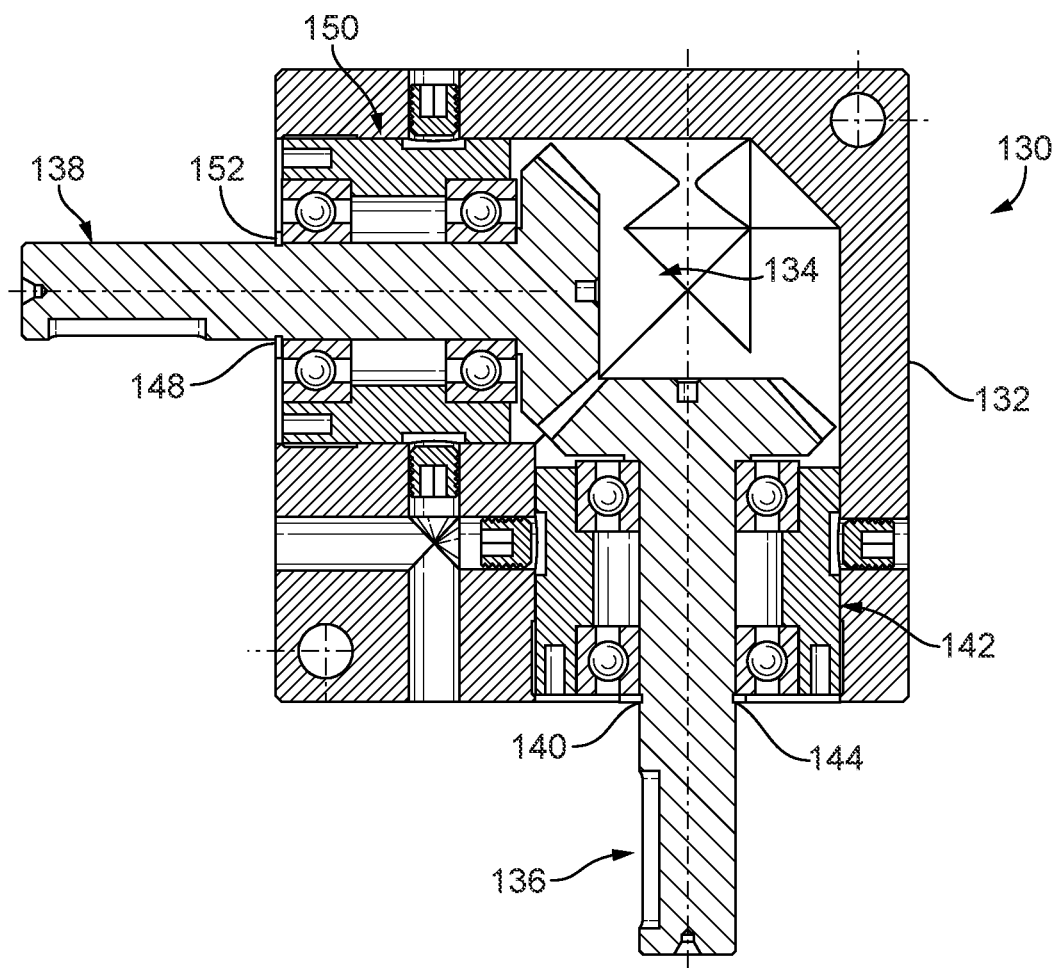
FIG. 5A is an exemplary embodiment of a gear assembly incorporated into the tool of FIG. 5.

Continuing to refer to FIG. 5-11, the gear assembly 130 is secured to the base 112 of the holding member 110. As shown in FIG. 5A, the gear assembly 130 has a gear housing 132, a gear system 134 within the gear housing 132, a first drive member 136 and a second drive member 138. The first drive member 136 extends from the gear housing 132 in a first direction that is the same as the direction the first hotstick adapter 116 extends from the base 112. In this exemplary embodiment, the first drive member 136 includes a first axel extending through an aperture 140 in the gear housing 132. The gear assembly 130 may include a ball bearing bushing 142 and rubber seal 144 adjacent the aperture 140 that permits the first axel 136 to pass through the gear housing 132. The ball bearing bushing 142 permits the first axel 136 to rotate freely, and the rubber seal 144 seals the aperture 140 from certain environmental conditions. An end of the first axel 136 outside the gear housing 132 is connected to a second hotstick adapter 146. The second hotstick adapter 146 permits a second extendable reach tool 542, e.g., a hotstick seen in FIG. 1, to be coupled to the gear assembly 130 so that the first axel 136 can be rotated or otherwise driven by the second extendable reach tool 542. The second drive member 138 extends from the gear housing 132 in a second direction that is parallel to the base 112 of the holding member 110. In the exemplary embodiment shown, the second direction is substantially perpendicular to the first direction associated with the first gear drive member 136. The second drive member 138 includes a second axel extending through an aperture 148 in the gear housing 132. The gear assembly 130 may include a ball bearing bushing 150 and rubber seal 152 adjacent the aperture 148 that permits the second axel 138 to pass through the gear housing 132. The ball bearing bushing 150 permits the second axel 138 to rotate freely, and the rubber seal 152 seals the aperture 148 from certain environmental conditions. An end of the second axel 138 outside the gear housing 132 is connected to the head driver 160. The gear system 134 is within the gear housing 132 and is provided to translate rotational movement of the first axel 136 to rotational movement of the second axel 138. As such, the end of the first axel 136 inside the gear housing 132 and the end of the second axel 138 in the gear housing are operatively coupled or meshed to the gear system 134. In an exemplary embodiment, the gear system 134 may include one or more worm gears meshed with one or more spur gears. In another exemplary embodiment, the gear system 134 may include a plurality of bevel gears that form a right angle gear system. A non-limiting example of such a right angle bevel gear system is the BGH31-1 right angle bevel gearbox manufactured by Ondrives Ltd. of Derbyshire, England. The gear ratio of the gear assembly 130 is dependent upon a number of factors, including for example, the size of the main conductor and the tap conductor to be connected, the type fastener 530 on the connector 520, and the dimensions of the wedge assembly 522 of connector 520. For example, the gear ratio of the gear assembly 134 may range from about 1:1 to about 1:20.

Continuing to refer to FIG. 5-11, the head driver 160 is provided to drive the fastener 530 of the connector 520. The head driver 160 may be integrally or monolithically formed into the second drive member 138 or the head driver 160 may be secured to the second drive member 138 using, for example, mechanical fasteners. The head driver 160 is configured and dimensioned to couple to a head of the fastener 530 of the connector 520 in order to drive the wedge of the connector 520 as is known. For example, the head driver 160 may be a cylindrical body with a hexagonal opening in one end adapted to fit onto a hexagonal head of a fastener 530, similar to a socket of a socket set.

Referring now to FIGS. 12-16, another exemplary embodiment of the tool according to the present disclosure is shown. In this exemplary embodiment, the tool 200 includes a connector holding member 210, a carriage loading system 230, a gear assembly 250 and a fastener head driver 280. For ease of description, the connector holding member 210 may also be referred to herein as a "carriage," the carriage loading system 230 may also be referred to herein as the "loading system," the gear assembly 250 may also be referred to herein as a "gearbox" and the fastener head driver 280 may also be referred to herein as the "head driver." The loading system 230 is configured and dimensioned to operatively interact with the carriage 210 so as to cause the carriage 210 to move between a loading position and a loaded position. In the loading position, a connector 520 mounted to the carriage 210 is aligned for coupling to the head drive 280, and in the loaded position the fastener 530 of the connector 520 mounted to the carriage 210 is operatively coupled to the head drive 280. In the exemplary embodiment shown, the loading system 230 includes a piston support member 231, seen in FIG. 13, one or more piston housings 232, one or more pistons 234 and a biasing member 236, e.g., a tension spring, within each piston housing and operatively coupled to the piston 234. The piston support member 231 is secured to the gear assembly housing 252 of the gear assembly 250. Each piston 234 has one end that is partially within a piston housing 232 and one end connected to the carriage 210. In this configuration, the biasing member 236 normally bias the carriage 210 toward the gearbox 250, i.e., toward the loaded position, with sufficient force to hold a connector 520 mounted on the carriage 210 into operative engagement with the head driver 280 as described below. This force to hold the connector may also be referred to herein as a "holding force." As a non-limiting example, the holding force may be in the range from about 5 lbs. to about 30 lbs.

Figure 12:
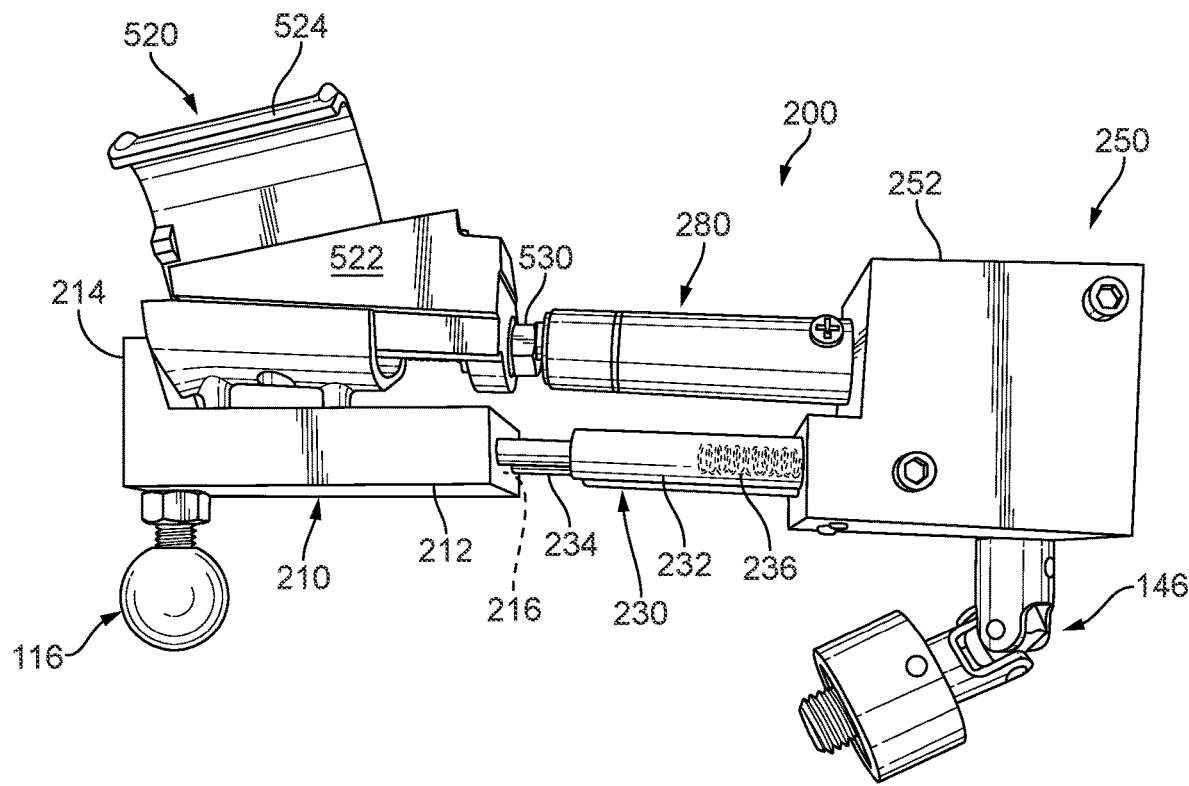
FIG. 12 is a first side perspective view of another exemplary embodiment of the tool according to the present disclosure.
Figure 12A:
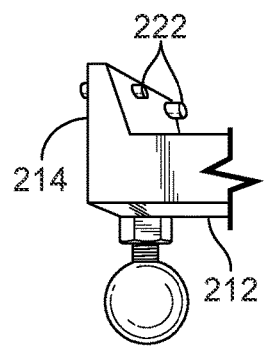
FIG. 12A is an enlarge portion of a connector holding member of the tool of FIG. 12.

In this exemplary embodiment, the holding member 210 includes base 212 and a connector brace 214. The base 212 includes one or more piston apertures 216 configured and dimensioned to receive one or more pistons 234 of the loading system 230 so that the carriage 210 can be moved by the loading system 230 between the loading position and the loaded position. The base 212 also includes one or more slots 218, seen in FIGS. 13 and 14, configured and dimensioned to receive an eye 528 of a connector 520, seen in FIG. 15. In this configuration, a connector 520 can be mounted to the carriage 210 by inserting the eye 528 into a slot 218 in the base 212 such that one end of the connector abuts the connector brace 214. Extending from the base 212 is a first hotstick adapter 116 described above and used to couple a first extendable reach tool, e.g., the hotstick 540 seen in FIG. 1, to the base 212. In the exemplary embodiment shown, the first hotstick adapter 116 may be a Ram Mounts universal ball and socket arm mounting system, manufactured by National Products, Inc., similar to that shown in FIG. 5. The connector brace 214 extends from the base 212 and includes one or more pins 222, seen in FIG. 12A, used to help align and hold the connector 520 to the carriage 210. The connector brace 214 may be integrally or monolithically formed into the base 212 or the connector brace 214 may be secured to the base 212 using, for example, welds or mechanical fasteners.

Figure 13:
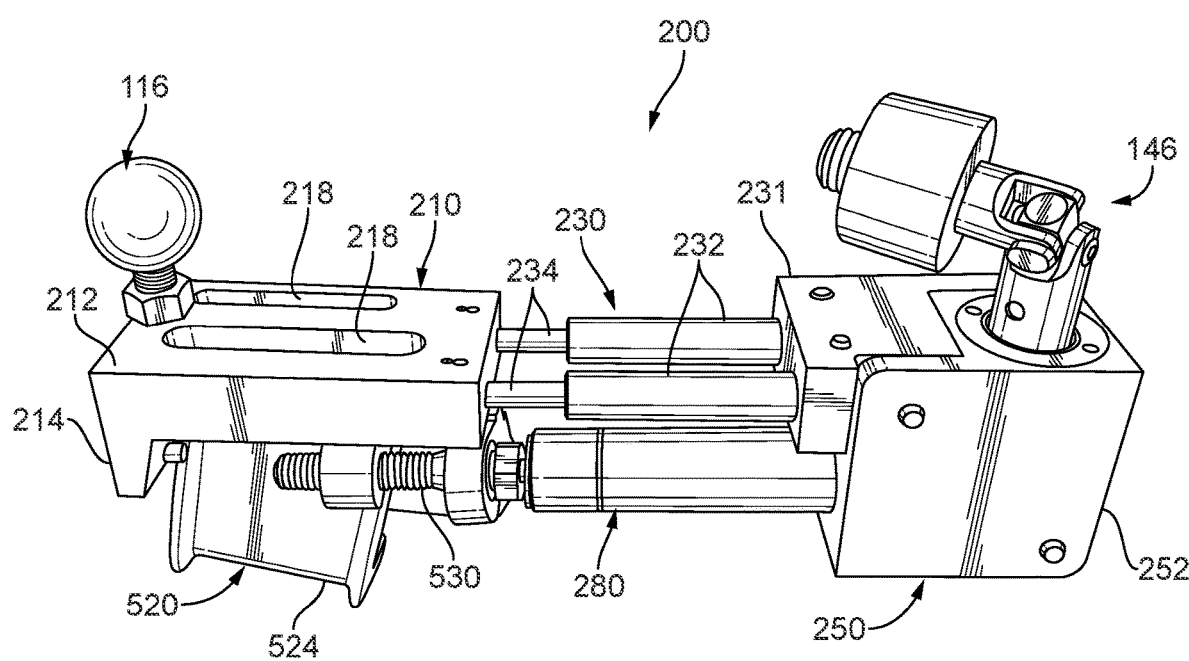
FIG. 13 is a second side perspective view of the tool of FIG. 12.
Figure 14:
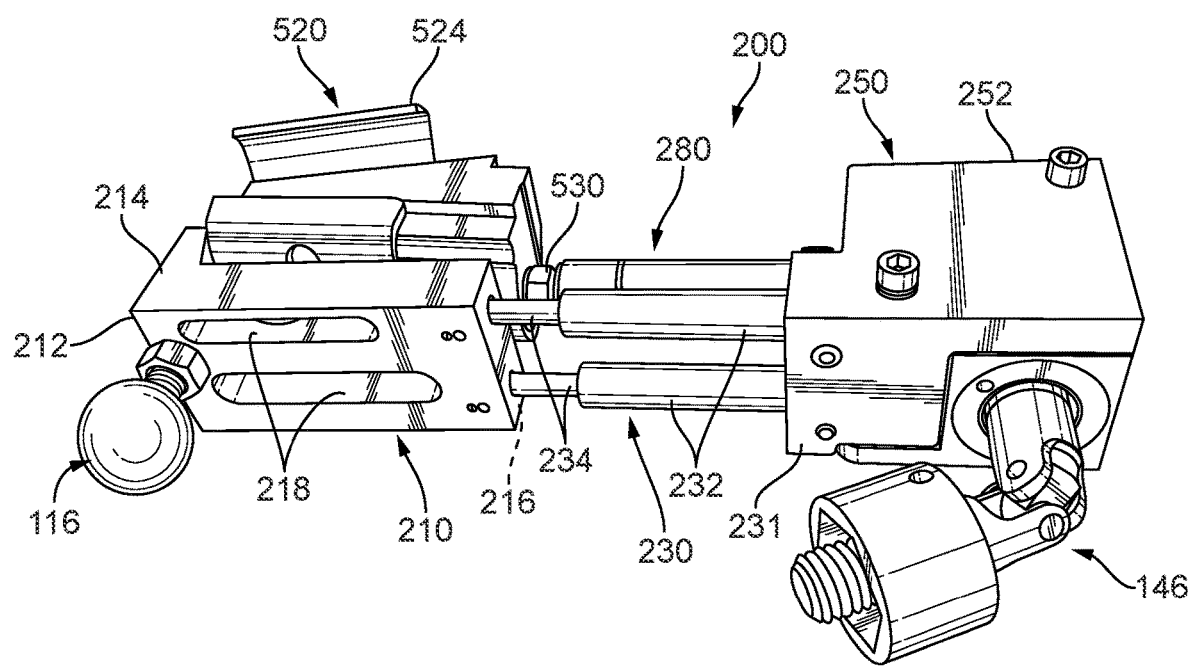
FIG. 14 is a bottom perspective view of the tool of FIG. 12.
Figure 15:
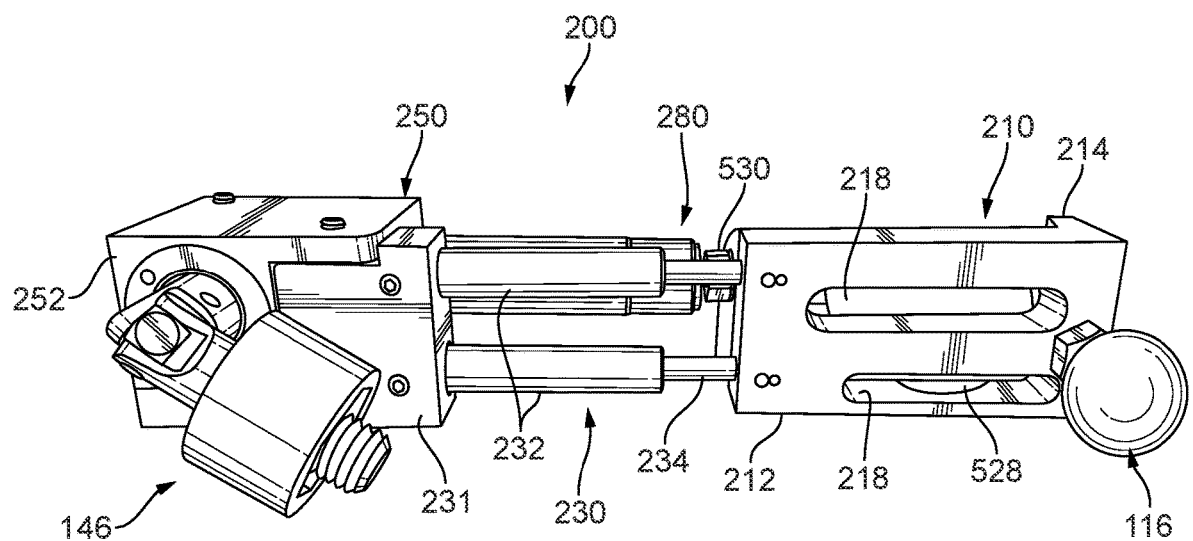
FIG. 15 is another bottom perspective view of the tool of FIG. 12.
Figure 16:
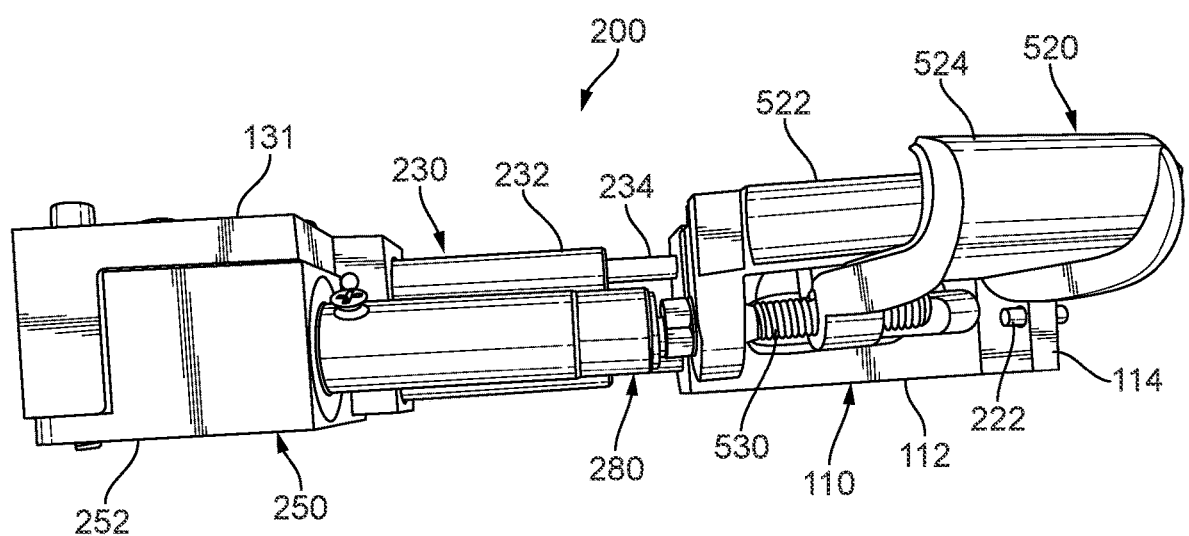
FIG. 16 is a top perspective view of the tool of FIG. 12.

Continuing to refer to FIG. 12-16, the gear assembly 250 is secured to the piston support member 231, as shown in FIG. 13. The gear assembly 250 has a gear housing 252, a gear system 134 within the gear housing 252, a first drive member 136 and a second drive member 138. The gear assembly 250 is substantially similar to the gear assembly 130 described above with reference to FIG. 5A such that like components have the same reference numerals and a description thereof is not repeated. Similar to the embodiment shown in FIG. 5, the first drive member 136 of the gear assembly 250 is connected to the second hotstick adapter 146.

Continuing to refer to FIG. 12-16, the head driver 280 is provided to drive the fastener 530 of the connector 520. The head driver 280 may be integrally or monolithically formed into the second drive member 138 of the gear assembly 250 or the head driver 280 may be secured to the second drive member 138 using, for example, mechanical fasteners. The head driver 280 is configured and dimensioned to couple to a head of the fastener 530 of the connector 520 in order to drive the wedge of the connector 520 as is known. For example, the head driver 280 may be a cylindrical body with a hexagonal opening in one end adapted to fit onto a hexagonal head of a fastener 530, similar to a socket of a socket set.

Figure 32:
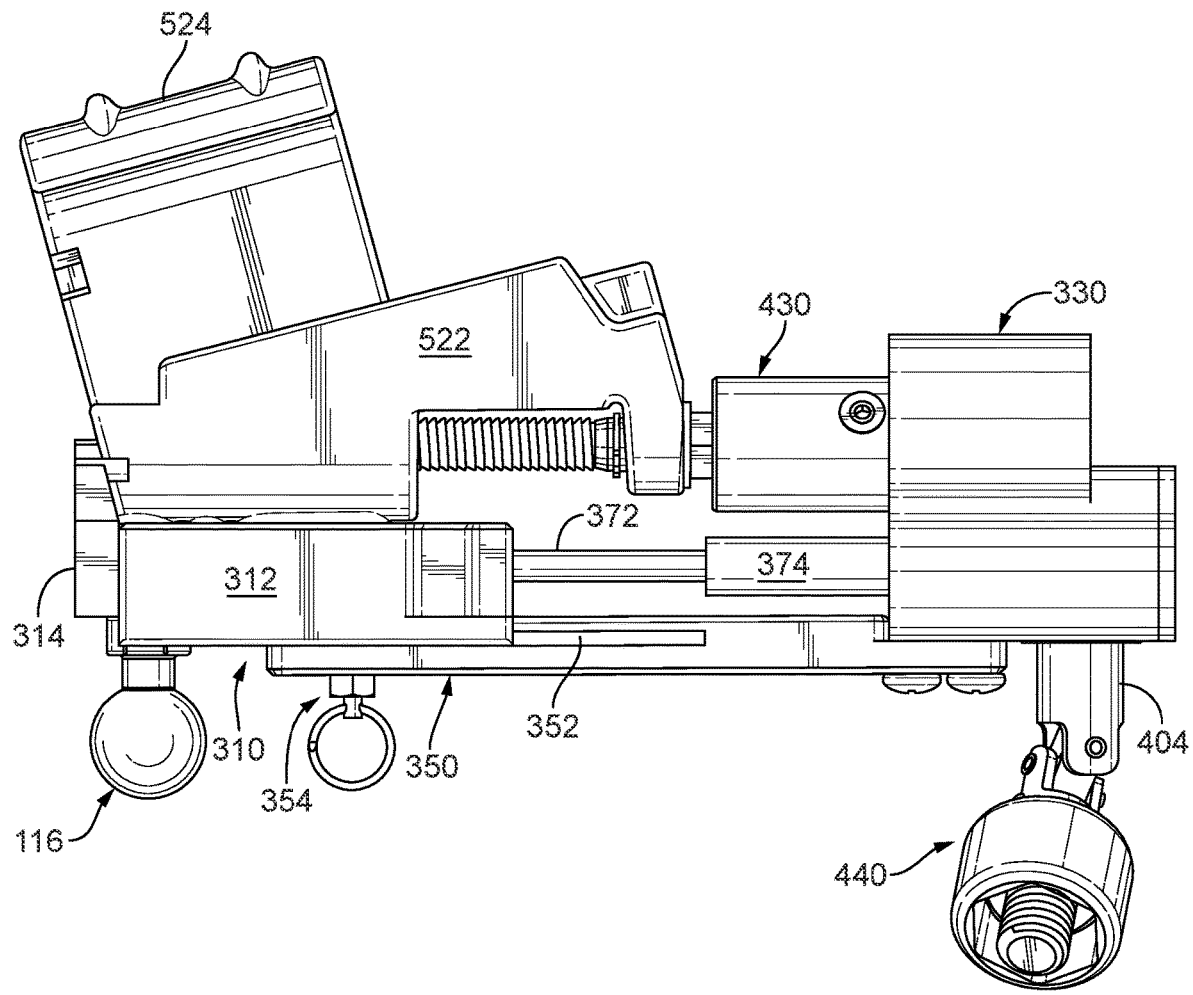
FIG. 32 is a side elevation view of the tool and connector of FIG. 31, illustrating the connector attached to the tool and the tool in the loaded position.

Referring now to FIGS. 17-32, another exemplary embodiment of the tool according to the present disclosure is shown. In this exemplary embodiment, the tool 300 includes a connector holding member 310, an interface housing 330, a rail 350 extending between the connector holding member 310 and the interface housing 330, a carriage loading system 370, a gear assembly 400 and a fastener head driver 430. A portion of the carriage loading system 370 and the gear assembly 400 are positioned within the interface housing 330. For ease of description, the connector holding member 310 may also be referred to herein as a "carriage." The carriage loading system 370 may also be referred to herein as the "loading system." The gear assembly 400 may also be referred to herein as a "gearbox," and the fastener head driver 430 may also be referred to herein as the "head driver." The loading system 370 is configured and dimensioned to operatively interact with the carriage 310 so as to cause or facilitate movement of the carriage 310 between a loading position and a loaded position. In the loading position, seen in FIG. 30, a connector 520 can be mounted to the carriage 310 so that a head of the fastener 530 of the connector 520 is aligned for coupling to the head driver 430. In the loaded position, seen in FIG. 32, the connector 520 is mounted to the carriage 310 and the head of the fastener 530 is operatively coupled to the head driver 430.

Continuing to refer to FIGS. 17-32, in this exemplary embodiment, the holding member 310 includes base 312 and a connector brace 314. The base 312 includes one or more piston apertures 316, seen in FIG. 25, configured and dimensioned to receive one or more pistons 372 of the loading system 370, seen in FIG. 21B, so that the carriage 310 can be moved by the loading system 370 between the loading position and the loaded position. The base 312 also includes one or more slots 318, seen in FIG. 17, configured and dimensioned to receive an eye 528 of a connector 520, seen in FIG. 30. In this configuration, a connector 520 can be mounted to the carriage 310 by inserting the eye 528 into a slot 318 in the base 312 such that one end of the connector 520 abuts the connector brace 314. Extending from the base 312 is a first adapter 116 described above and used to couple a first extendable reach tool, e.g., the hotstick 540 seen in FIG. 1, to the base 312. The first adapter 116 may be integrally or monolithically formed into the base 312 or the first adapter 116 may be secured to the base 312 using a fastener, such as by threading the first adapter 116 into a threaded mounting hole 320 in the base 312, shown in FIGS. 22 and 23. In the exemplary embodiment shown, the first adapter 116 may be a Ram Mounts universal ball and socket arm mounting system, manufactured by National Products, Inc., similar to that shown in FIG. 5. The connector brace 314 extends from the base 312 and includes one or more pins 322, seen in FIGS. 17 and 21A, used to help align and hold the connector 520 to the carriage 310. The connector brace 314 may be integrally or monolithically formed into the base 312 or the connector brace 314 may be secured to the base 312 using, for example, mechanical fasteners or welds.

Referring to FIGS. 22-25, a bottom surface 312a of the base 312 includes a track 324 having a pair of guide arms 327 configured to fit within slots 352 in the rail 350 so that the slots 352 guide the carriage 310 along the rail 350 between the loading position and the loaded position. In the base 312 of the carriage 310 within the track 324 is at least one locking aperture 326. The locking aperture 326 interacts with a removable locking pin 354 mounted to the rail 350 to releasably lock the carriage 310 in the loading position. A non-limiting example of a removable locking pin 354 is a retractable spring loaded plunger shown in FIGS. 23 and 24. In the embodiment shown in FIGS. 23 and 24, the removable locking pin 354 is a retractable spring loaded plunger that includes an outer hollow bolt 358 and an inner plunger 360 that is spring loaded and movable within the outer bolt 358 so that when a ring 362 attached to the plunger 360 is pulled the plunger 360 withdraws within the bolt 358, and when the ring 362 is released the spring biases the plunger 360 to its normal position extending from the distal end of the bolt 358. To attach the removable locking pin 354 to the rail 350, a portion of the threaded bolt 358 is attached to a the threaded aperture 356 in the rail 350, and the removable locking pin 354 locks the carriage 310 in the locking position when the plunger 360 of the removable locking pin 354 is aligned with the locking aperture 326 in the base 312 of the carriage.

Figure 17:
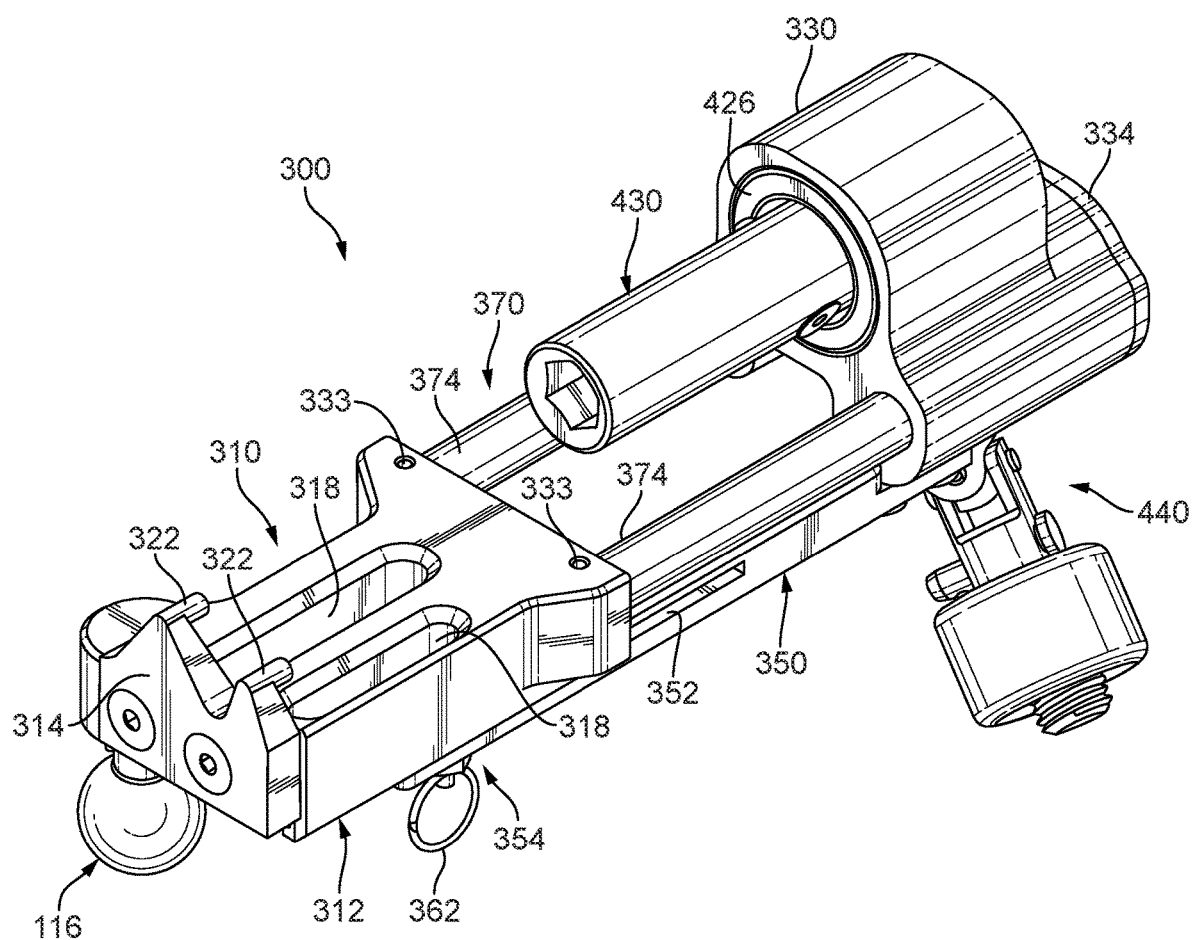
FIG. 17 is a top perspective view of another exemplary embodiment of the tool according to the present disclosure.
Figure 18:
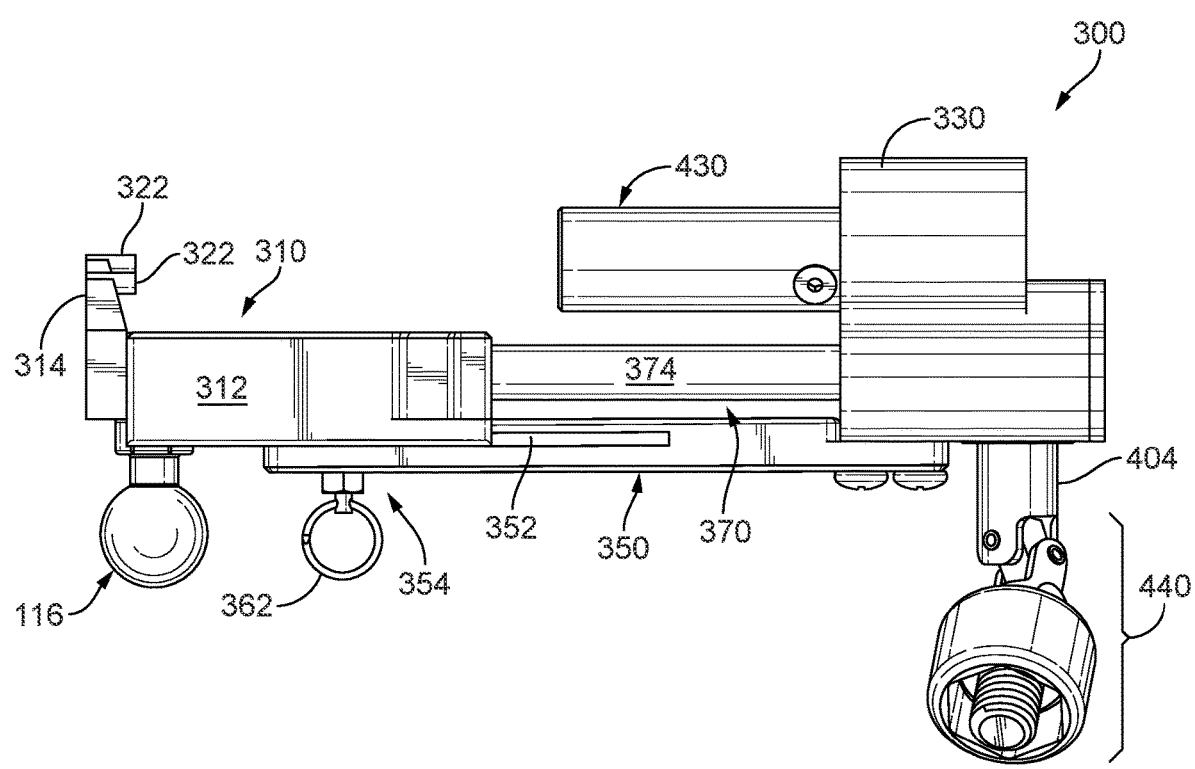
FIG. 18 is a side elevation view of the tool of FIG. 17.
Figure 19:
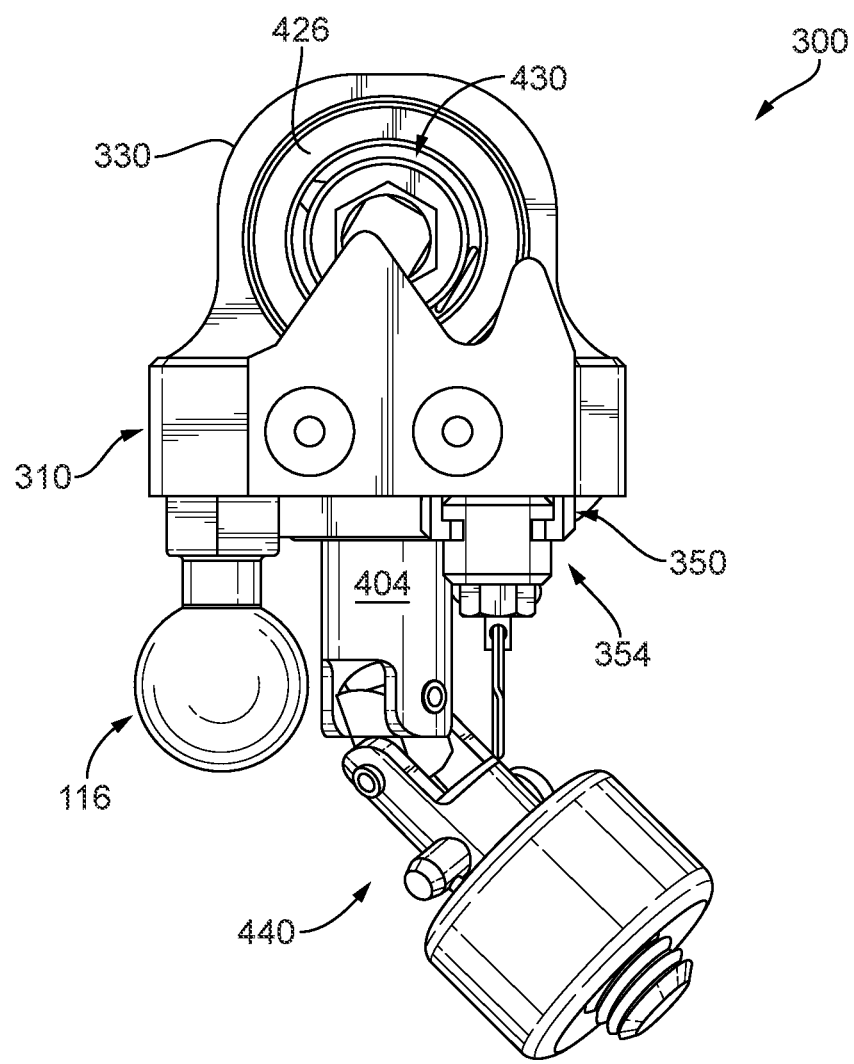
FIG. 19 is an end elevation view of the tool of FIG. 17.
Figure 21A:
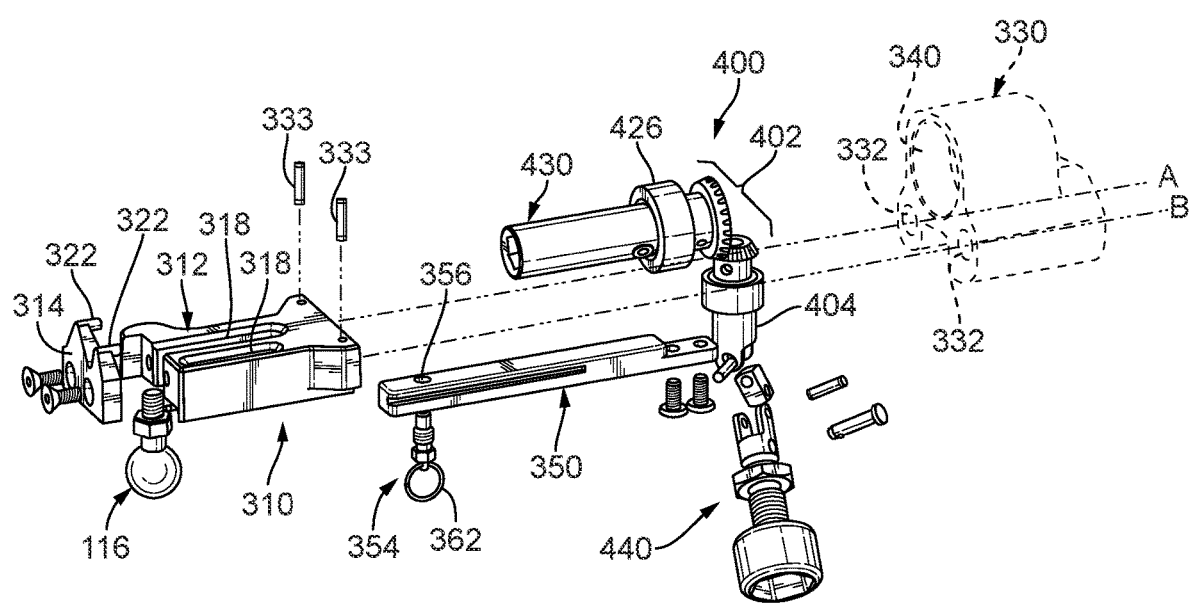
FIGS. 21A and 21B are an exploded perspective view of the tool of FIG. 17.
Figure 21B:
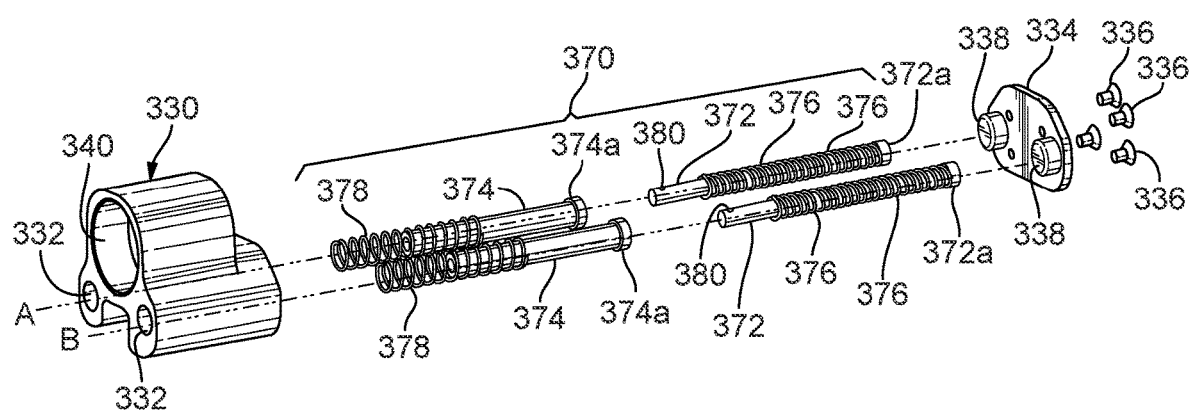
Figure 22:
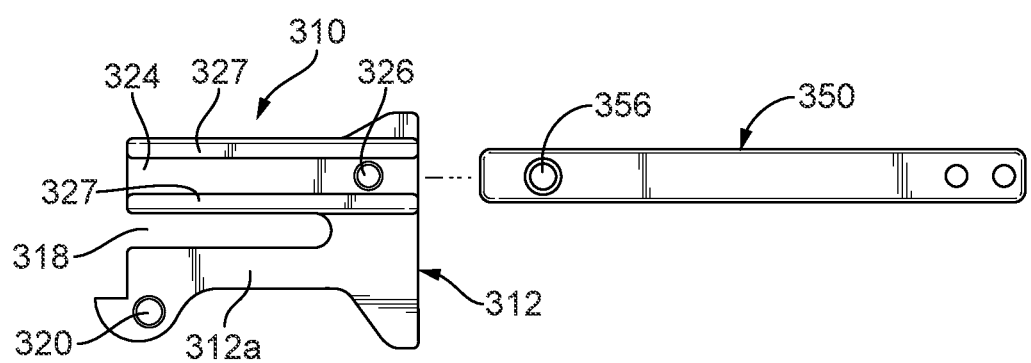
FIG. 22 is a bottom plan view of a carriage and rail of the tool of FIG. 17.
Figure 23:
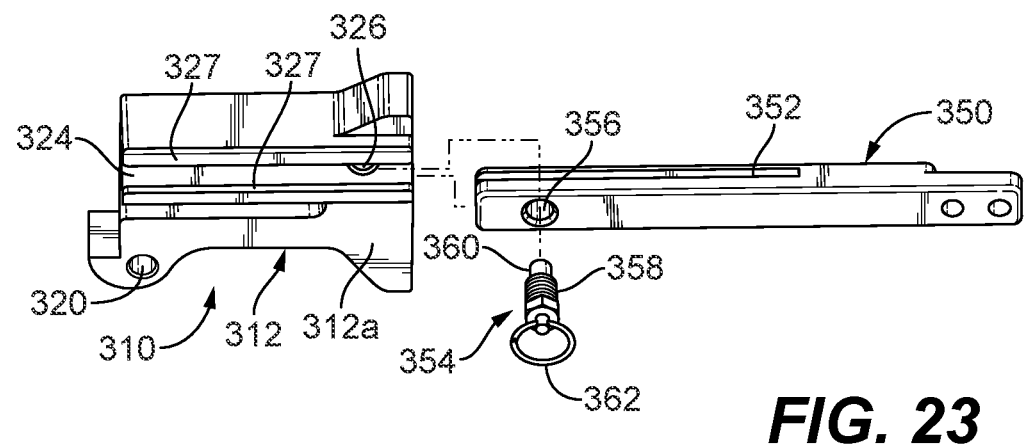
FIG. 23 is a bottom perspective view of a carriage and rail of FIG. 22.
Figure 24:
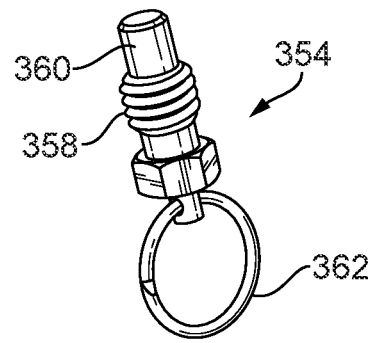
FIG. 24 is a perspective view of a removable locking pin attached to the rail of FIG. 23.
Figure 25:
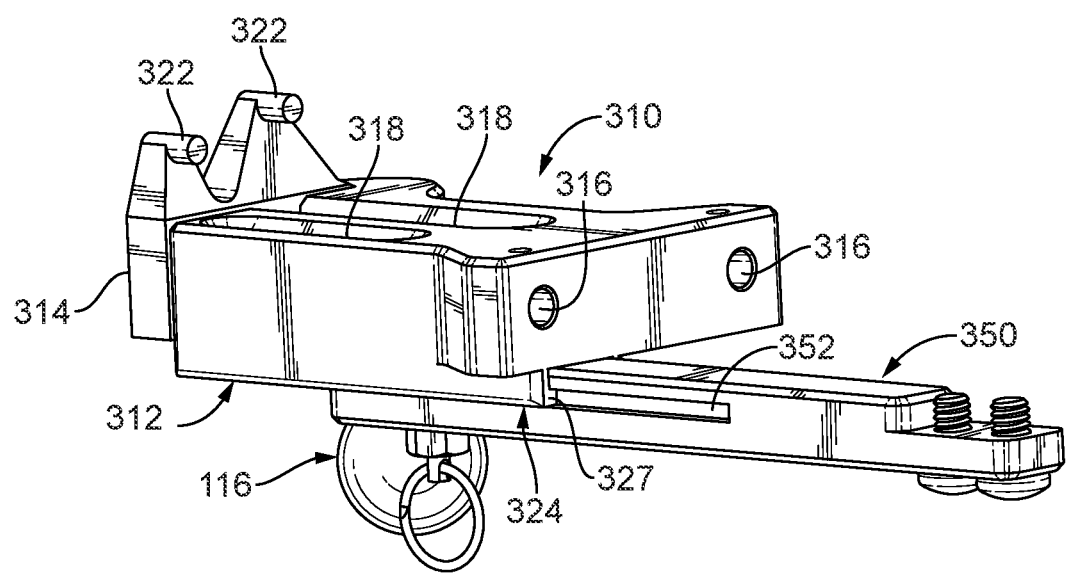
FIG. 25 is a side perspective view of the carriage and rail of FIG. 23, illustrating a track of the carriage positioned within slots in the rail.

Referring again to FIG. 21B, in the exemplary embodiment shown, the loading system 370 includes one or more pistons 372, one or more piston housings 374, one or more inner biasing members 376 and one or more outer biasing members 378. Each piston 372 includes a stop 372a at a proximal end, and each piston housing 374 includes a stop 374a at a proximal end. A non-limiting example of an inner biasing member 376 and an outer biasing member is a compression spring. A distal end of each piston 372 is inserted into the one or more inner biasing members 376 with the stop 372a holding the biasing members on the piston 372, and the distal end of the piston 372 and biasing members 376 are inserted into a piston housing 374. The stop 372a also prevents the proximal end of the piston 372 from passing through the distal end of the piston housing 374. A distal end of the piston housing 374 is then inserted into one or more outer biasing members 378. The piston housing 374 and outer biasing members 378 are then inserted into piston mounting apertures 332 in the interface housing 330, as shown. When the piston housing 374 and outer biasing members 378 are inserted into a piston mounting aperture 332, the distal end of the piston housing 374 passes through the piston mounting aperture 332, as seen in FIG. 17, with the stop 374a preventing the proximal end of the piston housing 374 from exiting the piston mounting aperture 332. In addition, the outer biasing member 378 remains within the piston mounting aperture 332 in the interface housing 330. The pistons 372 are then pressed into the respective piston housing 374 compressing the biasing members 376 within the piston housings. With the piston housings 374 and pistons 372 within the interface housing 330, tabs 338 of an interface housing cap 334 contact the stops 372a at the proximal end of the pistons 372, and the interface housing cap 334 is then secured to the interface housing 330 using, for example, fasteners 336. With the loading system 370 assembled at least partially within the interface housing 330, the outer biasing members 378 bias the piston housings 374 in the direction of the interface housing cap 334, and the inner biasing members 372 bias the pistons in the direction of the interface housing cap 334. With the loading system 370 assembled with the interface housing 330, the distal end of each piston 372 is inserted into a piston aperture 316, seen in FIG. 25, in the carriage 310 and secured within the piston aperture 316 using, for example, pins 333, e.g., spring pins, inserted through the carriage 310 and an aperture 380 in each piston 372, as shown in FIGS. 21A and 21B. In this configuration, the inner biasing members 376 normally bias the carriage 310 toward the interface housing cap 334 of the interface housing 330, i.e., toward the loaded position, with sufficient force to hold a connector 520 mounted on the carriage 310 into operative engagement with the head driver 430 as described below. This force to hold the connector 520 may also be referred to herein as a "holding force." As a non-limiting example, the holding force may be in the range from about 5 lbs. to about 30 lbs.

Referring now to FIG. 21A, the gear assembly 400 is at least partially assembled within the interface housing 330. The gear assembly 400 includes a gear system 402 within the interface housing 330, a first drive member 404 and a second drive member 406. The first drive member 404 extends from the interface housing 330 and is operatively connected to a second adapter 440, and the second drive member 406 of the gear assembly 400 extends from the interface housing 330 and is operatively coupled to the head driver 430. In the exemplary embodiment shown, the first and second drive members are axels. However, the first and second drive members may be any structures suitable to drive the respective gears in the first and second gear assemblies 410 and 420.

Figure 28:
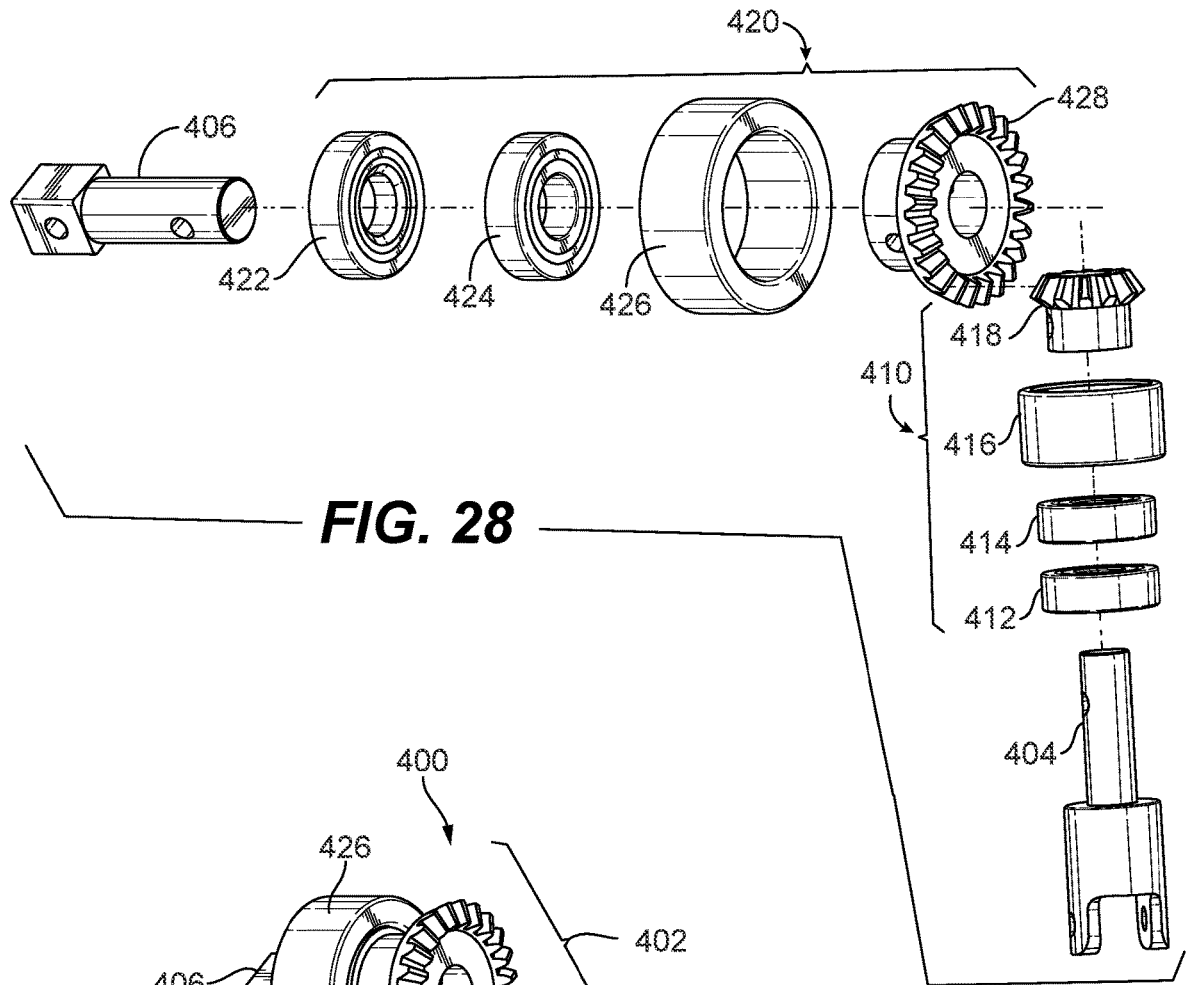
FIG. 28 is an exploded perspective view of the gear assembly of FIG. 26.
Figure 29:
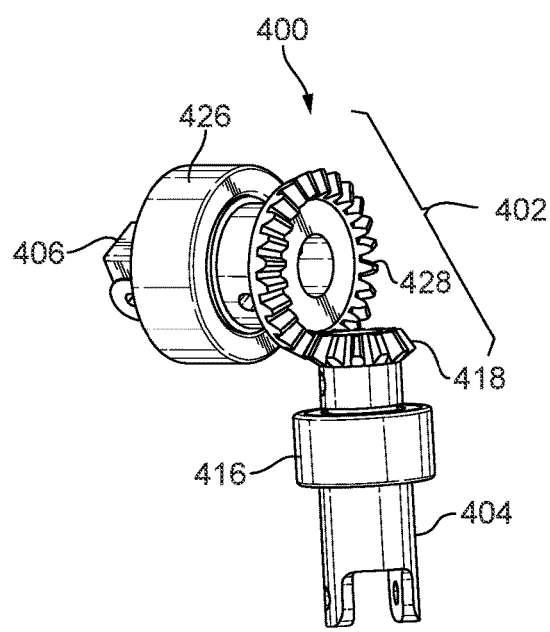
FIG. 29 is a perspective view of the gear assembly of FIG. 26, illustrating a bevel gear of a first gear assembly meshed with a bevel gear of a second gear assembly.
Figure 30:
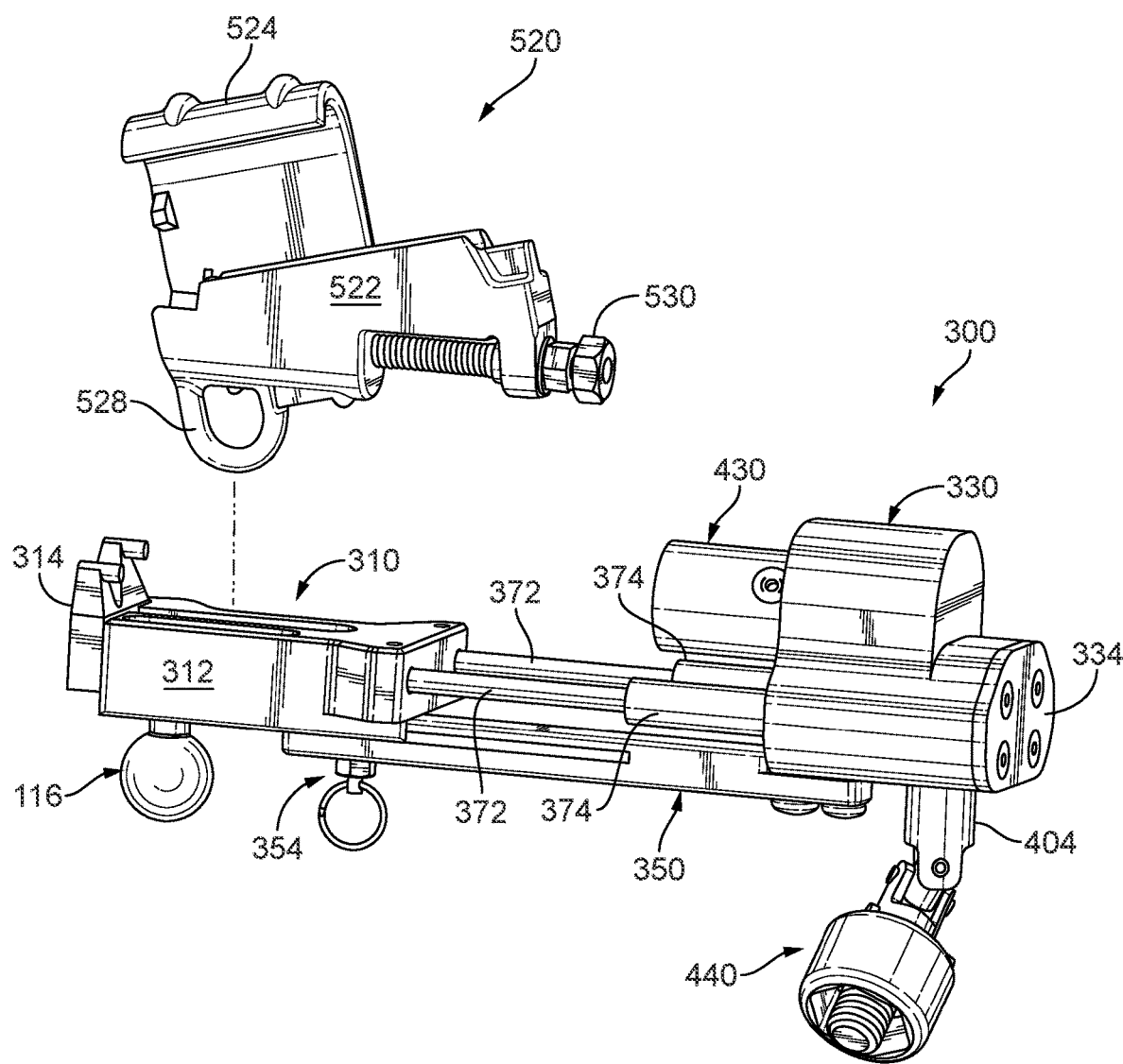
FIG. 30 is a side perspective view of the tool of FIG. 17 with a connector positioned for attachment to the tool.
Figure 31:
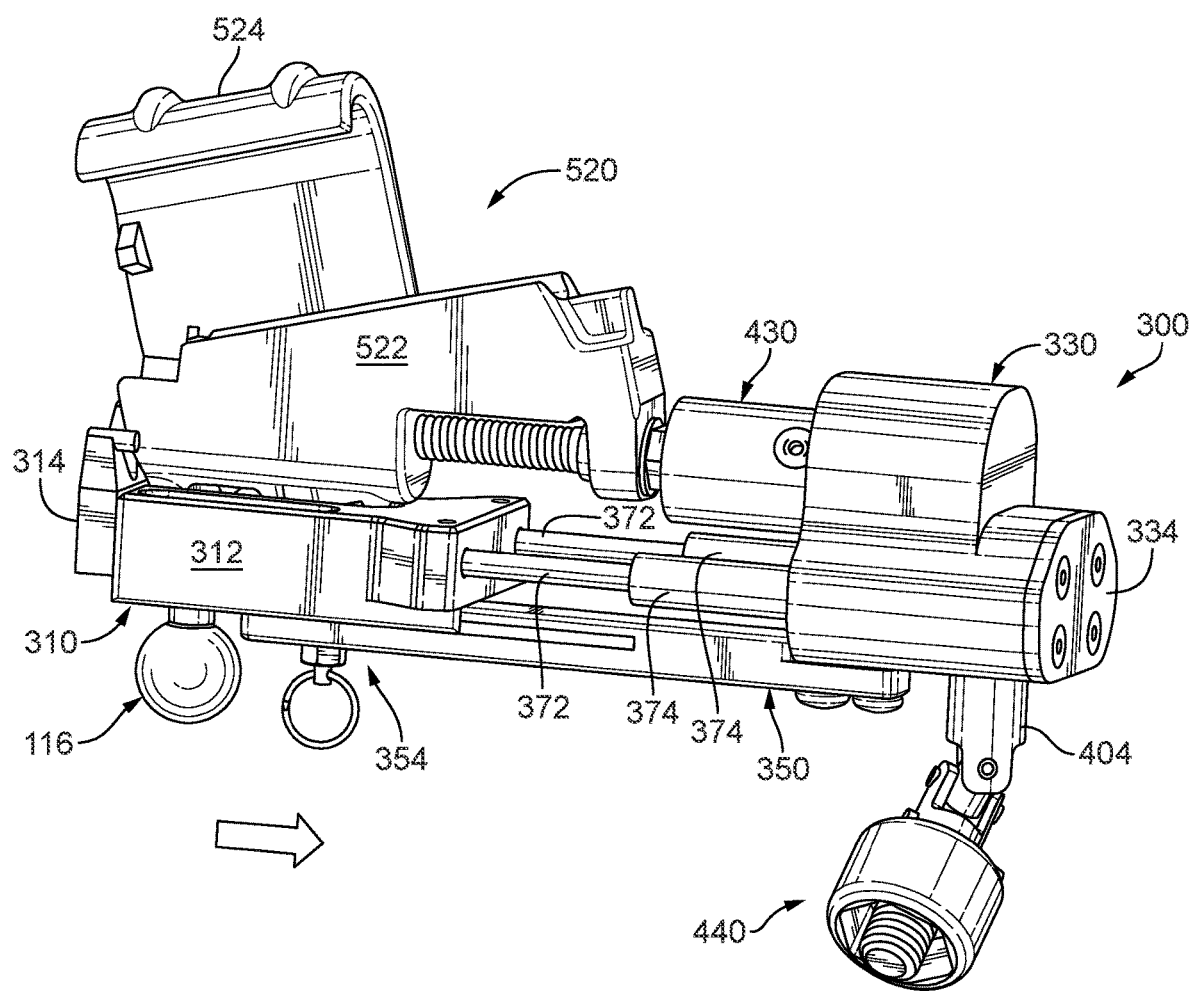
FIG. 31 is a side perspective view of the tool and connector of FIG. 30, illustrating the connector attached to the tool and the tool moving from a loading position to a loaded position.

Referring to FIGS. 21A and 26-29, the gear system 402 includes a first gear assembly 410 and a second gear assembly 420, seen in FIGS. 28 and 29. The first gear assembly 410 includes an inner bearing 412, an outer bearing 414, a bushing 416 and a bevel gear 418. The inner bearing 412 and the outer bearing 414 are positioned on the first drive member 404, as shown in FIG. 28. The bushing 416 is positioned over the inner and outer bearings 412 and 414, as shown in FIG. 29. The bevel gear 418 is then secured to a proximal end of the first drive member 404. Similarly, the second gear assembly 420 includes an inner bearing 422, an outer bearing 424, a bushing 426 and a bevel gear 428. The inner bearing 422 and the outer bearing 424 are positioned on the second drive member 406, as shown in FIG. 28. The bushing 426 is positioned over the inner and outer bearings 422 and 424, as shown in FIG. 29. The bevel gear 428 is then secured to a proximal end of the second drive member 406. In this exemplary embodiment, the gear system 402 translates rotational movement of the first drive member 404 to rotational movement of the second member 406.

Figure 20:
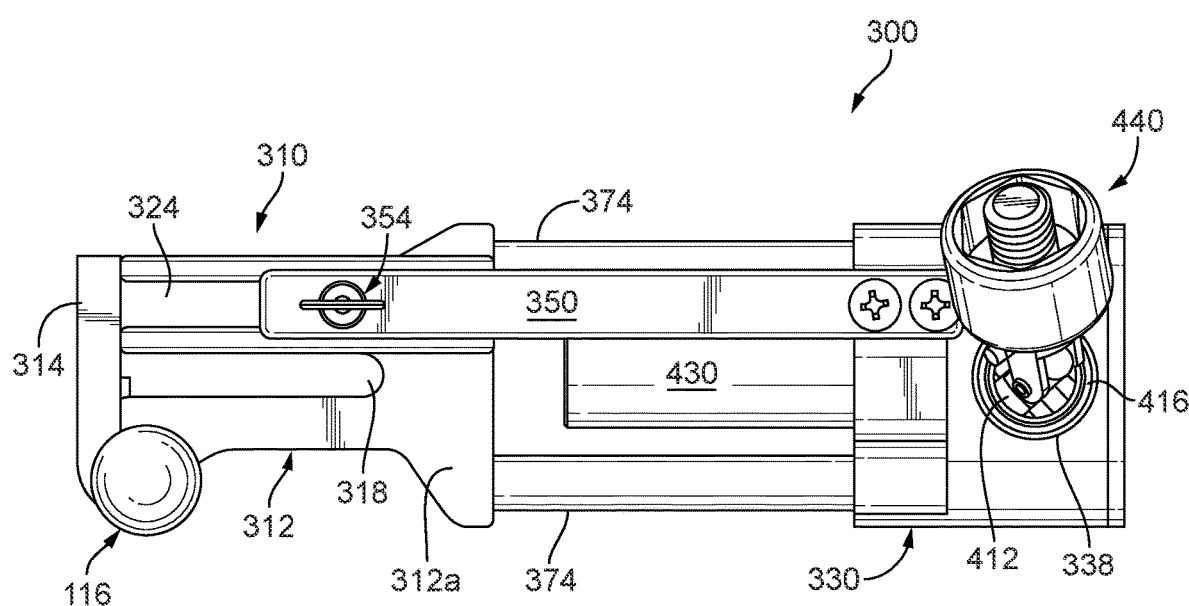
FIG. 20 is bottom plan view of the tool of FIG. 17.

To secure the first gear assembly 410 to the interface housing 330, the bushing 416 is secured within an aperture 338, seen in FIG. 20, by for example a press fit. The inner and outer bearings 412 and 414 permits the first drive member 404 to rotate freely relative to the bushing 416. This positions the bevel gear 418 within a gear cavity within the interface housing 330. With the bushing 416 secured within the aperture 338 of the interface housing 330, a distal end of the first drive member 404 extends from the aperture 338 in a first direction that is substantially the same as the direction the first adapter 116 extends from the base 312. The bushing 416 may form a seal with the aperture 338 to seal the gear cavity of the interface housing 330 from certain environment conditions. In another exemplary embodiment, a seal member, e.g., and rubber seal, may be used to seal the gear cavity of the interface housing 330 from certain environment conditions.

To secure the second gear assembly 420 to the interface housing 330, the bushing 426 is secured within an aperture 340, seen in FIG. 21A, by for example a press fit. The inner and outer bearings 422 and 424 permit the second drive member 406 to rotate freely relative to the bushing 426. This positions the bevel gear 428 within the gear cavity within the interface housing 330 so that the bevel gear 428 of the second gear assembly 420 meshes with the bevel gear 418 of the first gear assembly 410. With the bushing 426 secured within the aperture 340 of the interface housing 330, a distal end of the second drive member 406 extends from the aperture 340 in a direction that is substantially parallel to the rail 350. The bushing 426 may form a seal with the aperture 340 to seal the gear cavity of the interface housing 330 from certain environment conditions. In another exemplary embodiment, a seal member, e.g., and rubber seal, may be used to seal the gear cavity of the interface housing 330 from certain environment conditions.

It is noted that the gear ratio of the gear assembly 402 is dependent upon a number of factors, including for example, the size of the main conductor and the tap conductor to be connected, the type of fastener 530 on the connector 520, and the dimensions of the wedge assembly 522 of the connector 520. For example, the gear ratio of the gear assembly 402 may range from about 1:1 to about 1:20.

Figure 26:
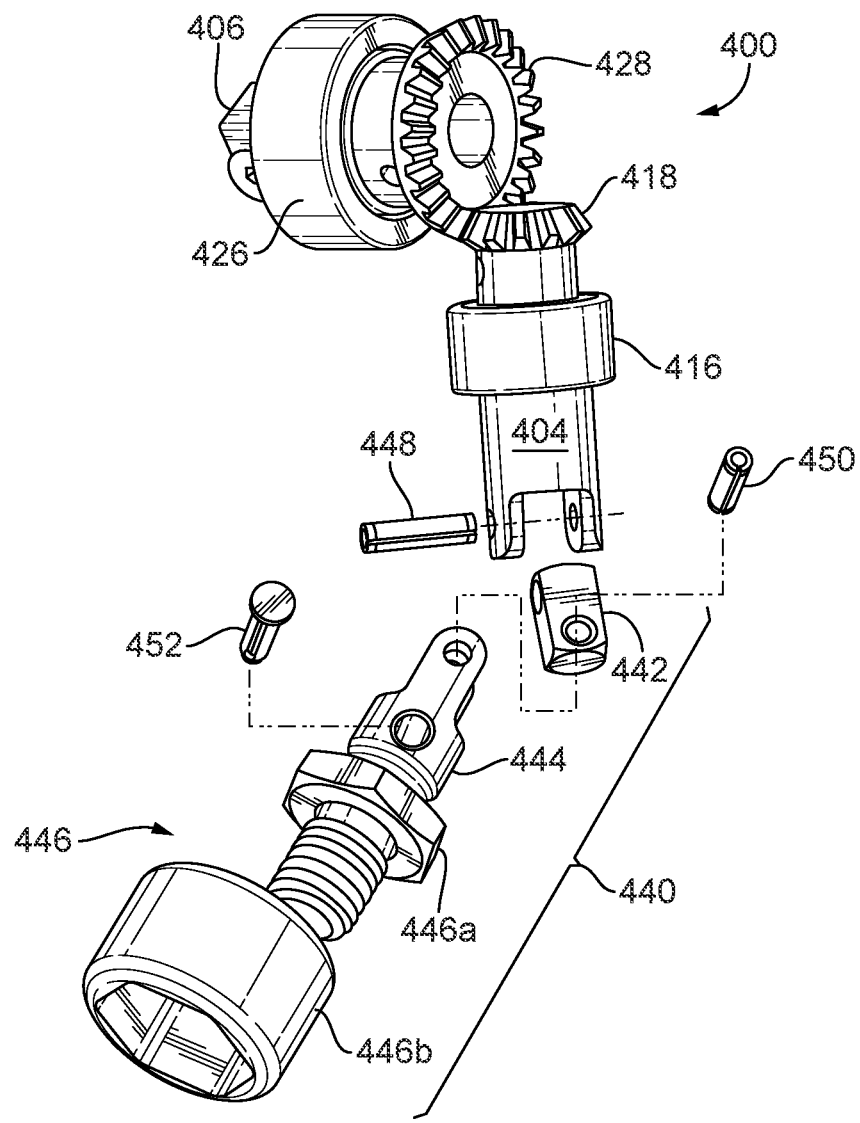
FIG. 26 is a perspective view of a gear assembly and adapter included in the tool of FIG. 17.
Figure 27:
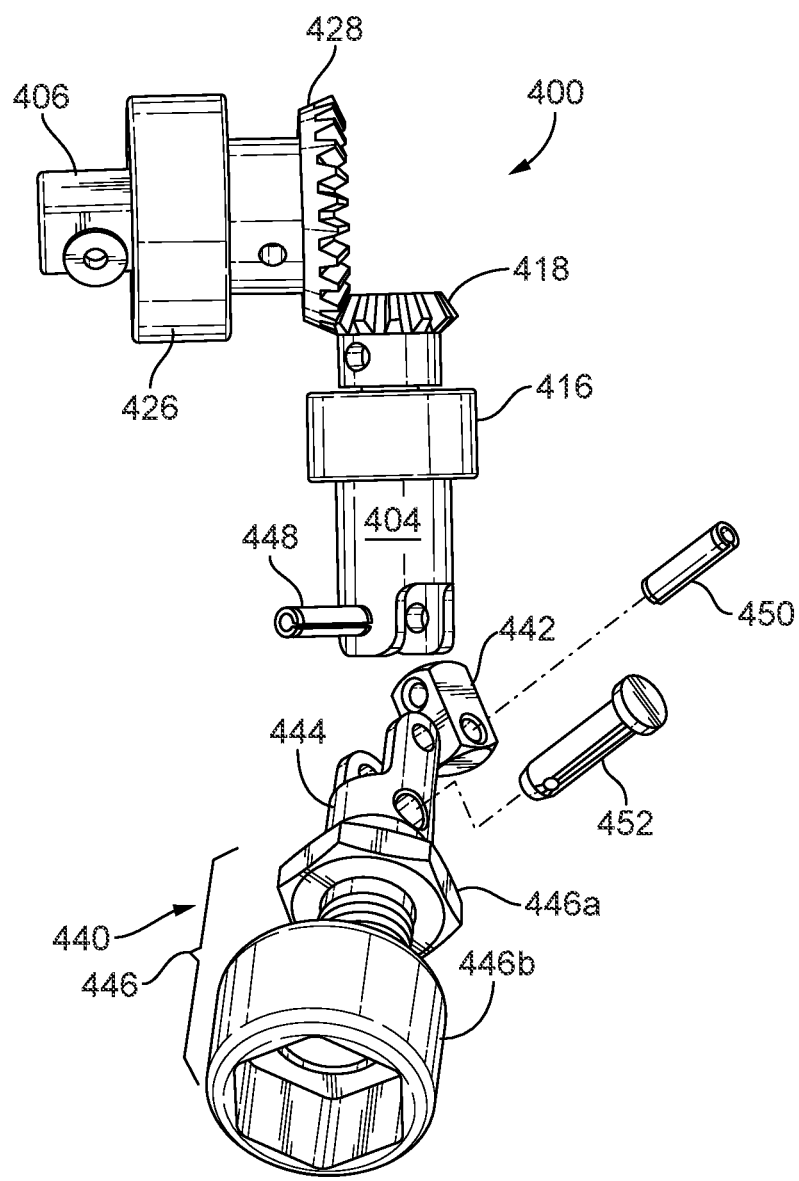
FIG. 27 is a side elevation view of the gear assembly and adapter of FIG. 26.

Continuing to refer to FIG. 26, the distal end of the first drive member 404 outside the interface housing 330 is connected to a second adapter 440. The second adapter 440 permits a second extendable reach tool, e.g., the hotstick 542 seen in FIG. 1, to be coupled to the first gear assembly 410 so that the first drive member 404 can be rotated or otherwise driven by the second extendable reach tool 542. The second adapter 440 includes a first universal joint member 442, a second universal joint member 444 and a removable coupler 446. The universal joint member 442 is coupled to the distal end of the first drive member 404 using, for example, pin 448 so that the universal joint member 442 is movable, e.g., pivotable, relative to the first drive member 404. The second universal joint member 444 is coupled to the first universal joint member 442 using, for example, pin 450 so that the second universal joint member 444 is movable, e.g., pivotable, relative to the first universal joint member 442. In this exemplary embodiment, the removable coupler 446 includes a sleeve 446a and a socket 446b secured to the sleeve 446a. The sleeve 446a is coupled to the second universal joint member 444 using, for example, quick release pin 452 so that the removable coupler 446 can be quickly connected to and release from the second universal joint member 444. In this exemplary embodiment, the removable coupler 446 is configured and dimensioned to couple to the second extendable reach tool, e.g., the hotstick 542.

Referring again to FIGS. 17, 18 and 30-32, the head driver 430 is provided to drive a fastener 530 of the connector 520. The head driver 430 may be integrally or monolithically formed into the second drive member 406 or the head driver 430 may be secured to the second drive member 406 using, for example, mechanical fasteners. The head driver 430 is configured and dimensioned to couple to a head of the fastener 530 of the connector 520 in order to drive the wedge of the connector 520 as is known. For example, the head driver 280 may be a cylindrical body with a hexagonal opening in one end adapted to fit onto a hexagonal head of a fastener 530, similar to a socket of a socket set.

To install the connector 520 onto the main conductor 510 and the tap conductor 500 using the tool 300, the lineman attaches or couples an extendable reach tool, e.g., the hotstick 540, to the first hotstick adapter 116, and an extendable reach tool, e.g., the hotstick 542, to the second adapter 440. The extendable reach tool, e.g., the hotstick 540, coupled to the first hotstick adapter 116 is then moved away from the interface housing 330 such that the carriage 310 moves to the rail 350 to the loading position. In the loading position, the inner plunger 360 of the removable locking pin 354 is engaged with the locking aperture 326 in the carriage 310. An eye 528 of the connector 520 is positioned in a slot 318 in the carriage 310 so that the head of the fastener 530 is aligned with the fastener head driver 430. The lineman then raises the tool 300 so that the main conductor 510 and the tap conductor 500 are within the frame 524 of the connector 520, similar to that shown in FIGS. 1 and 2. The interface 526 of the connector 520 is then placed between the main conductor 510 and the tap conductor 500 using, for example, one of the extendable reach tools, e.g., the hotstick 540 or 542. One of the extendable reach tools, e.g., hotstick 540, is then coupled to the ring 362 of the removable locking pin 354 and the ring 362 is pulled downward causing the inner plunger 360 of the removable locking pin 354 to disengaged from the locking aperture 326 in the carriage 310 thus freeing the carriage to move to the loaded position, seen in FIGS. 31 and 32. In the loaded position the head of the fastener 530 is operatively engaged with the head driver 430.

The extendible reach tools, e.g., the hotstick 542, coupled to the second adapter 440 is then rotated causing the first drive member 404 to rotate. Rotation of the first drive member 404 activates the gear system 402 translating rotational movement of the first drive member 404 to rotational movement of the second drive member 406. Rotational movement of the second drive member 406 causes the head driver 430 to rotate in, for example, a clockwise direction. Rotation of the head driver 430 causes the head of the fastener 530 of the connector 520 to rotate thus tightening the wedge assembly 522 of the connector. As the wedge assembly 522 tightens, the tap conductor 500 and interface 526 move toward the main conductor 510 within the frame 524 tightening the tap conductor 500 and interface 526 to the main conductor 510 and the frame 524. In instances when the fastener 530 is a shear head type fastener, the wedge assembly 522 is tightened until the shear head of the fastener 530 shears, which indicates that conductors 500 and 510 are connected together with sufficient force. Once the connector 520 is secured to the conductors 500 and 510, the first extendable reach tool 540 is again moved toward the loading position releasing the head of the fastener 530 from the head driver 430 so that the tool 300 can be lowered to separate the tool 300 from the connector 520.

While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A tool for attaching an electrical connector to electrical conductors using one or more extendible reach tools, the tool comprising:
   a gear assembly having first and second drive members extending therefrom, the gear assembly being adapted to translate movement of the first drive member to movement of the second drive member;
   a head driver having a first end connected to the first or second drive member such that movement of the first or second drive member causes movement of the head driver;
   a connector holding member configured to support and at least temporarily hold the electrical connector; and
   a loading system connected between the gear assembly and the connector holding member, the loading system being movable between a loading position where the connector holding member can support and at least temporarily hold the electrical connector and a loaded position where the head driver can operatively engaged with a fastener of the electrical connector, and the loading system being configured to normally bias the connector holding member toward the loaded position.

2. The tool according to claim 1, wherein the gear assembly translates rotational movement of the first drive member to rotational movement of the second drive member.

3. The tool according to claim 1, wherein the gear assembly further comprises a gear housing and a gear system within the gear housing, wherein the first drive member is at least partially within the gear housing and the second drive member at least partially within the gear housing.

4. The tool according to claim 3, wherein the gear system comprises a first bevel gear meshed with a second bevel gear.

5. The tool according to claim 1, further comprising a first adapter coupled to the first drive member or the second drive member, and a second adapter coupled to the connector holding member.

6. The tool according to claim 1, wherein the connector holding member comprises a carriage having at least one slot for coupling the connector to the carriage.

7. The tool according to claim 1, wherein the loading system comprises:
   at least one piston having a first end connected to the gear assembly housing and a second end connected to the connector holding member; and
   at least one biasing member associated with the at least one piston such that the at least one biasing member normally biases the connector holding member toward the loaded position.

8. A tool for attaching an electrical connector to electrical conductors using one or more extendible reach tools, the tool comprising:
   an interface housing;
   a gear assembly at least partially within the interface housing, the gear assembly having a gear system, a first drive member at least partially within the interface housing and a second drive member at least partially within the interface housing, wherein the first and second drive members are coupled to the gear system to translate rotational movement of the first drive member to rotational movement of the second drive member;
   a connector holding member configured to support and at least temporarily hold the electrical connector;
   a rail having a first end connected to the interface housing and a second end connected to the connector holding member so that the rail guides movement of the connector holding member between a loading position and a loaded position;
   a connector loading system connected to the interface housing and the connector holding member, the connector loading system being configured to permit the connector holding member to move along the rail between the loading position and the loaded position, and to normally bias the connector holding member toward the loaded position; and
   a fastener head driver connected to the first or second drive member such that rotation of the first or second drive member causes rotation of the fastener head driver.

9. The tool according to claim 8, further comprising a first adapter coupled to the first drive member or the second drive member, and a second adapter coupled to connector holding member.

10. The tool according to claim 8, wherein the gear system comprises a first bevel gear meshed with a second bevel gear.

11. The tool according to claim 8, wherein the connector holding member comprises a carriage having at least one slot for coupling the connector to the carriage.

12. The tool according to claim 8, wherein the loading system comprises:
   at least one piston having a first end connected to the interface housing and a second end connected to the connector holding member; and
   at least one biasing member associated with the at least one piston such that the at least one biasing member normally biases the connector holding member toward the loaded position.

13. The tool according to claim 8, wherein the head driver includes a second end opposite the first end adapted to mate with a head of a fastener of the connector.

14. The tool according to claim 13, wherein the second end of the head drive is a socket.

15. A tool for attaching an electrical connector to electrical conductors using one or more extendible reach tools, the tool comprising:
   an interface housing;
   a gear assembly at least partially within the interface housing, the gear assembly having a gear system, a first drive member at least partially within the interface housing and a second drive member at least partially within the interface housing, wherein the first and second drive members are coupled to the gear system to translate rotational movement of the first drive member to rotational movement of the second drive member;
   a connector holding member configured to support and at least temporarily hold the electrical connector;
   a rail having a first end connected to the interface housing and a second end connected to the connector holding member so that the rail guides movement of the connector holding member between a loading position and a loaded position;
   a connector loading system connected to the interface housing and the connector holding member, the connector loading system being configured to permit the connector holding member to move along the rail between the loading position and the loaded position, and to normally bias the connector holding member toward the loaded position;
   a head driver connected to the first or second drive member such that rotation of the first or second drive member causes rotation of the fastener head driver;
   a first extendable reach tool adapter coupled to the first drive member or the second drive member; and
   a second extendable reach tool adapter coupled to the connector holding member.

16. The tool according to claim 15, wherein the gear system comprises a first bevel gear meshed with a second bevel gear.

17. The tool according to claim 15, wherein the connector holding member comprises a carriage having at least one slot for coupling the connector to the carriage.

18. The tool according to claim 15, wherein the loading system comprises:
   at least one piston having a first end connected to the interface housing and a second end connected to the connector holding member; and
   at least one biasing member associated with the at least one piston such that the at least one biasing member normally biases the connector holding member toward the loaded position.

19. The tool according to claim 15, wherein the head driver includes a second end opposite the first end adapted to mate with a head of a fastener of the connector.

20. The tool according to claim 19, wherein the second end of the head drive is a socket.

* * * * *